United States Patent [19]
Hikichi et al.

[11] Patent Number: 5,711,390
[45] Date of Patent: Jan. 27, 1998

[54] MOTORCYCLE HEIGHT ADUSTING METHOD AND APPARATUS

[75] Inventors: Toichiro Hikichi; Kazumitsu Kushida; Morio Sato; Sumitaka Ogawa, all of Saitama, Japan

[73] Assignee: Honda Giken Kogyo Kabushiki Kaisha, Tokyo, Japan

[21] Appl. No.: 476,315

[22] Filed: Jun. 7, 1995

[30]    Foreign Application Priority Data

Aug. 30, 1994  [JP]  Japan ................................... 6-205085

[51] Int. Cl.⁶ .................................................... B60G 17/01
[52] U.S. Cl. .......................... 180/219; 180/227; 280/703; 280/707
[58] Field of Search ........................ 180/219, 227, 180/231; 280/703, 704, 707, 709

[56]                References Cited

U.S. PATENT DOCUMENTS

| | | | |
|---|---|---|---|
| 5,086,866 | 2/1992 | Banjo et al. | 180/219 |
| 5,201,384 | 4/1993 | Kiyota et al. | 180/219 |
| 5,211,420 | 5/1993 | Iwashita | 180/219 X |
| 5,348,112 | 9/1994 | Vaillancourt | 180/227 |

FOREIGN PATENT DOCUMENTS 2-3758   1/1983   Japan .
5-16639  1/1993   Japan .

Primary Examiner—Kevin Hurley
Attorney, Agent, or Firm—Birch, Stewart, Kolasch & Birch, LLP

[57]   ABSTRACT

A method and device are provided for adjusting the height of a motorcycle equipped with a motorcycle-height changing device for increasing and decreasing the height of the motorcycle in accordance with the operation of an actuator controlled in accordance with information on the speed of the motorcycle. Thus, an operational delay can be prevented from occurring when stopping the motorcycle by an abrupt deceleration. In addition, the height of the motorcycle can be increased to a high value quickly even at the time the motorcycle is started. A first piece of set speed information is set for starting the operation of the actuator to decrease the height of the motorcycle, and a second piece of set speed information different from the first set speed information is set for starting the operation of the actuator to increase the height of the motorcycle.

24 Claims, 18 Drawing Sheets

ANGLE OF CUSHION LINK ARM

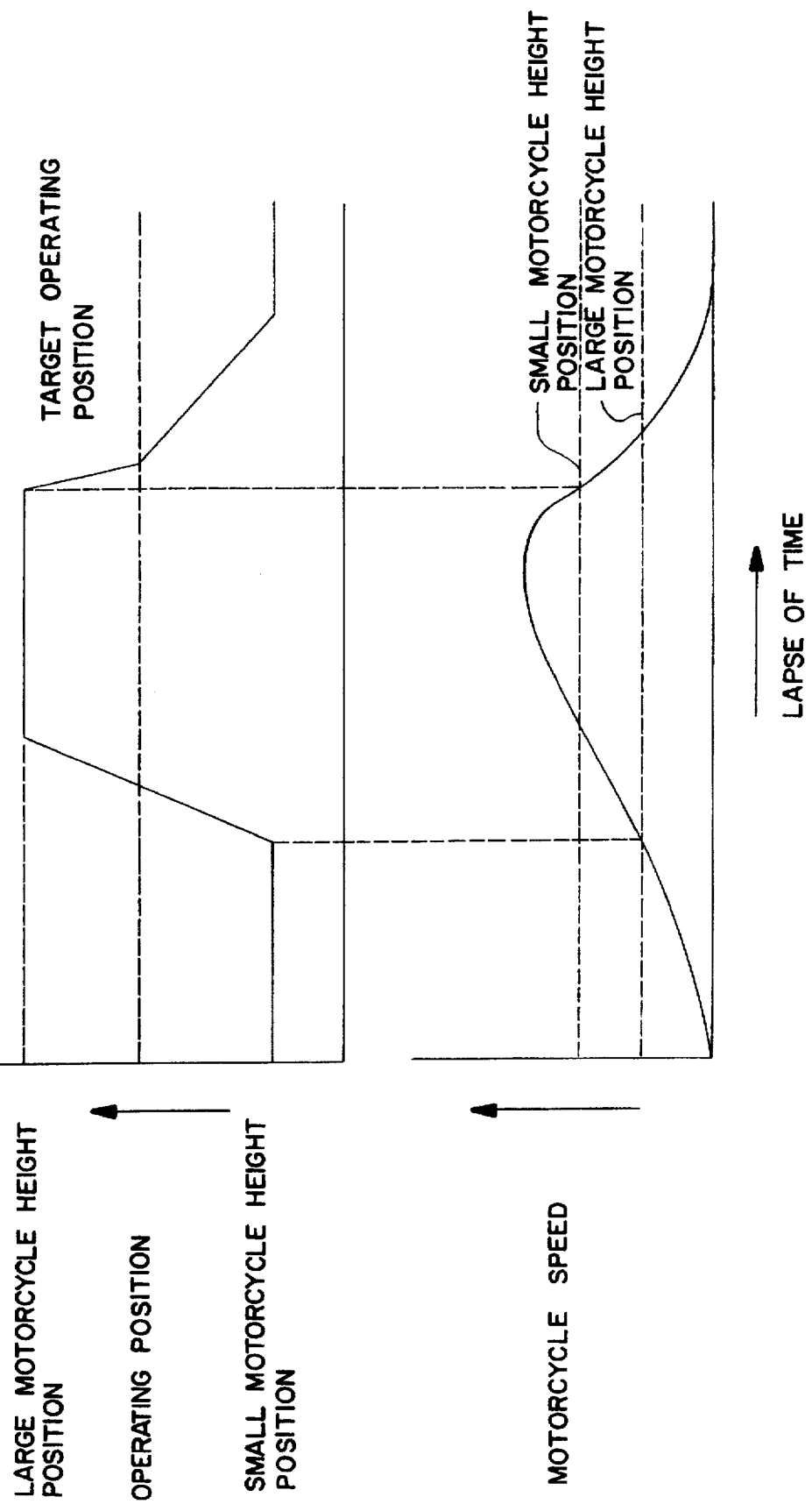

MOTORCYCLE HEIGHT ADJUSTING METHOD AND APPARATUS

BACKGROUND OF THE INVENTION

1. Field of the Invention

The present invention relates to a method for adjusting the height of a motorcycle. The method is used to control the operation of an actuator in accordance with information on the speed of the motorcycle and is equipped with a motorcycle-height changing means for increasing and decreasing the height of the motorcycle in accordance with the operation of the actuator.

2. Description of the Background Art

Conventional techniques are known for varying the height of a motorcycle in accordance with the speed of the motorcycle as disclosed in Japanese Patent Laid-open No. H516639 and Japanese Patent Publication H2-3758.

With the conventional techniques, the height of the motorcycle can be increased or decreased in accordance with fixed set information on the motorcycle speed. In the case of a sudden drop in motorcycle speed with the information on the motorcycle speed set at a relatively low fixed value, the motorcycle may have been stopped before the height thereof is completely decreased due to an operational delay of the technique caused by the sampling time of a speed sensor, the execution time required by an electronic control unit and the operation time required by the actuator. Taking this problem into consideration, the information on the motorcycle speed can be set at a relatively high fixed value. In this case, the motorcycle is kept at a small height at the start as it is until a high speed of the motorcycle is attained, providing the driver with no driving comfort.

SUMMARY AND OBJECTS OF THE INVENTION

The present invention addresses the problems encountered in the present state of the art. It is an object of the present invention to provide a technique for adjusting the height of a motorcycle which can prevent an operational delay from occurring when stopping the motorcycle by a sudden drop in speed. The height to a high value is changed fast at the time the motorcycle is started.

In order to achieve the object described above, the present invention provides a method for adjusting the height of a motorcycle equipped with a motorcycle-height changing means for increasing and decreasing the height of the motorcycle in accordance with the operation of an actuator controlled in accordance with information on the speed of the motorcycle. The method includes a first piece of set speed information which is set for starting the operation of the actuator to decrease the height of the motorcycle. A second piece of set speed information different from and preferably lower than, the first set speed information is set for starting the operation of the actuator to increase the height of the motorcycle.

In addition to the configuration of the invention, the first and second pieces of set speed information are changed in accordance with information on motorcycle-height positions.

In addition to the configuration of the invention, the pieces of set speed information are changed in accordance with a motorcycle-speed changing mode for changing the speed of the motorcycle.

In additional to the configuration of the invention, a piece of set speed information for changing the height of the motorcycle is varied in accordance with the rate of change in motorcycle speed.

In addition to the configuration of the invention, the rate of change in the motorcycle speed is checked to find out whether its value is normal or abnormal and the height of the motorcycle is changed in accordance with the speed of the motorcycle if the rate of change is found abnormal.

In addition to the configuration of the invention, the operating speed of the actuator is varied in accordance with the rate of change in the motorcycle speed.

In addition to the configuration of the invention, the motorcycle-height changing means is supported by a motorcycle-body frame in such a way that the motorcycle-height changing means can fluctuate. At the same time, the invention also employs, besides the actuator, a cushion link arm installed between a cushion unit and a link mechanism provided between the motorcycle-body frame and a swing arm supporting a rear wheel in a way allowing the rear wheel to rotate freely, wherein the cushion link arm can be swung to change a lever ratio of the link mechanism by the actuator between a large-motorcycle-height position and a small-motorcycle-height position through a change-point, a point between the large-motorcycle-height position and the small-motorcycle-height position for shrinking the cushion unit as much as possible.

Furthermore, according to the present invention, when the actuator is operated to reduce the height of the motorcycle during deceleration, the operating speed of the actuator is reduced during a period between a target operating position and a small-motorcycle-height position, a lower end of the operating range of the motorcycle-height changing means, to values lower than the rotating speeds of the actuator being decelerated during a period between a large-motorcycle-height position, an upper end of the operating range of the motorcycle-height changing means, and the target operating position which is preset between the small-motorcycle-height position and the large-motorcycle-height position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 22 is a diagram showing variations in motorcycle height with changes in motorcycle speed.

DETAILED DESCRIPTION OF THE PREFERRED EMBODIMENTS

The present invention will become apparent from the following detailed description of preferred embodiments with reference to the accompanying diagrams.

Figure 1:
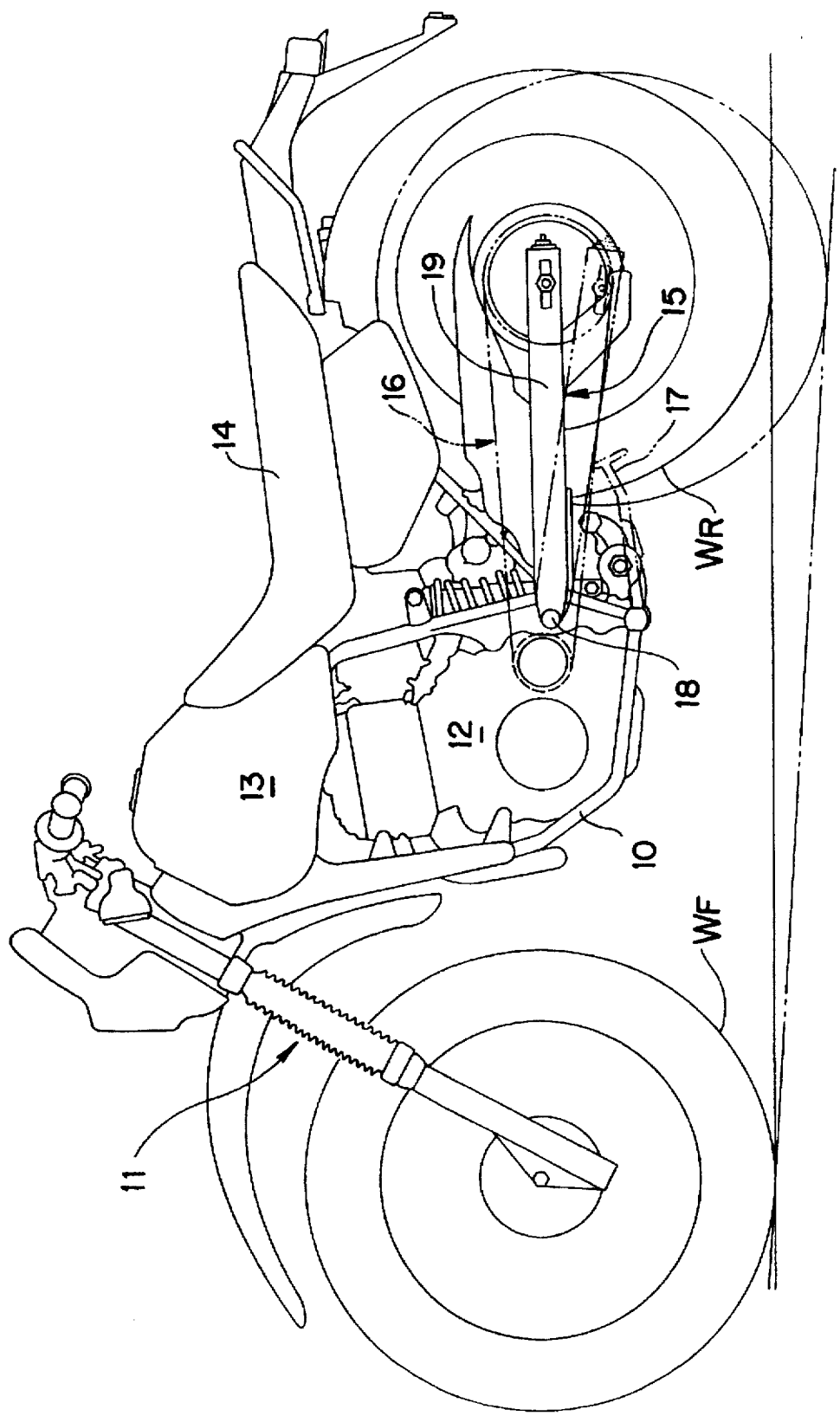
FIG. 1 is a diagram showing a side view of a first embodiment implementing a motorcycle.

A front wheel $W_F$ is suspended on the front part of a motorcycle-body frame 10 of the motorcycle through a front-wheel suspending apparatus 11 as shown in FIG. 1. In addition, a rear wheel $W_R$ is suspended on the rear part of the motorcycle-body frame 10 of the motorcycle through a rear-wheel suspending apparatus 15 along with a power unit 12 including an engine and a transmission, a fuel tank 13, a seat 14 and other components. The power output from the power unit 12 is transferred to the rear wheel $W_R$ through a power transferring means 16 which includes, among other components, an endless chain. On top of that, a side stand 17 is installed on the lower left portion of the motorcycle-body frame 10 in such a way that the side stand 17 can be raised by an individual's foot.

Figure 2:
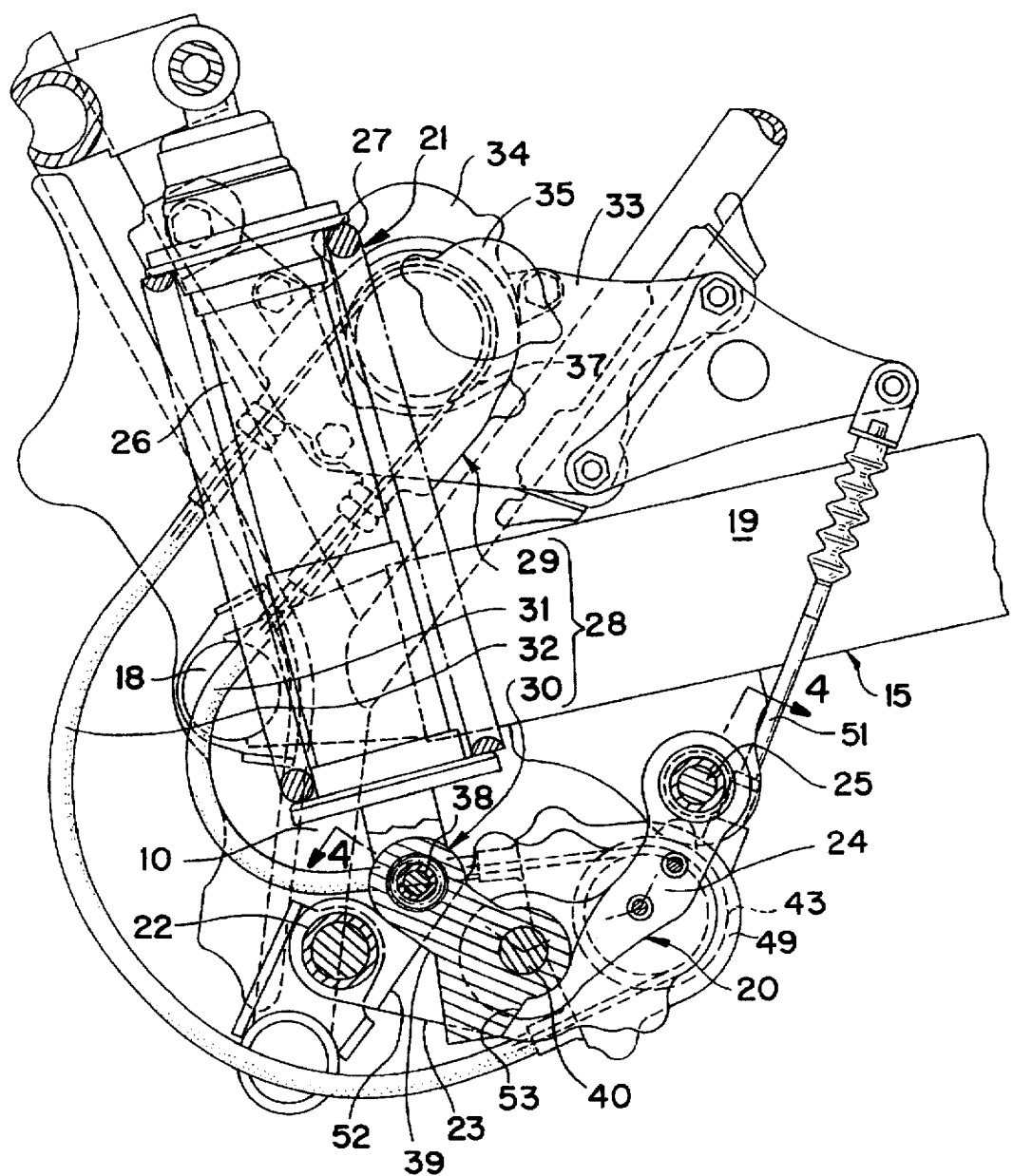
FIG. 2 is a diagram showing a cross section of the motorcycle along a line 2—2 shown in FIG. 4 which diagram shows a vertical cross-sectional side view of the motorcycle of FIG. 1 having the height thereof decreased to a low value and having its main components shown in an enlarged scale.
Figure 3:
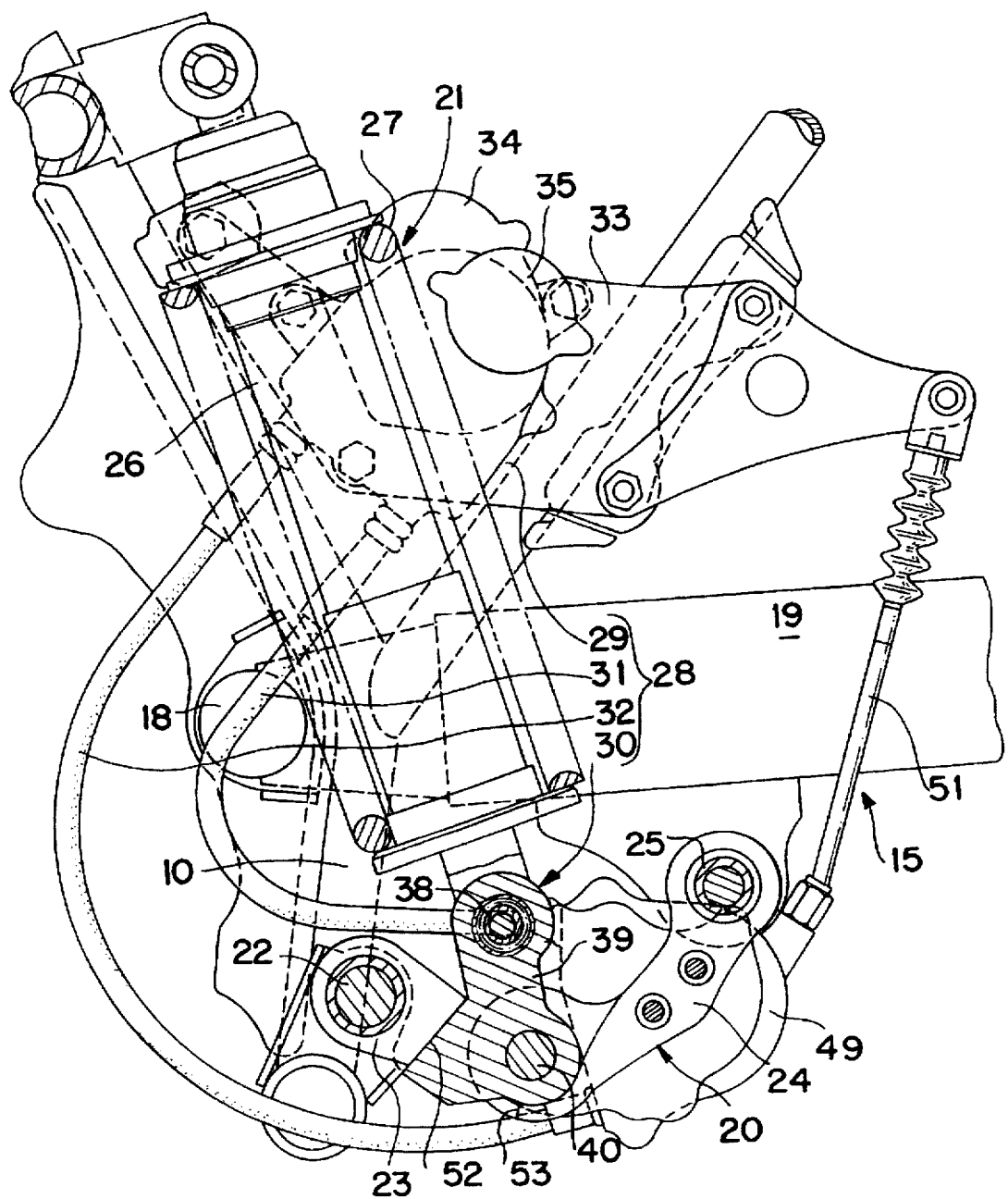
FIG. 3 is a counterpart diagram of FIG. 2 except that the height of the motorcycle is increased to a large value.

Referring to FIGS. 2 and 3, the front part of the rear-wheel suspending apparatus 15 is supported by the motorcycle-body frame 10 through a pivot axis 18 in such a way that the rear-wheel suspending apparatus 15 can fluctuate. The rear-wheel suspending apparatus 15 is also equipped with a swing arm 19, a link mechanism 20 and a cushion unit 21. The swing arm 19 is used for supporting the rear wheel $W_R$ in such a way that the rear wheel $W_R$ can rotate freely. The link mechanism 20 is provided between the motorcycle-body frame 10 and the lower part of the swing arm 19. The cushion unit 21 is provided between the motorcycle-body frame 10 and the link mechanism 20. The link mechanism 20 comprises a link arm 23 and a cushion rod 24. The front part of the link arm 23 is joined to the motorcycle-body frame 10 through a joining axis 22 in such a way that the link arm 23 can fluctuate up and down. One end of the cushion rod 24 is joined to the rear part of the link arm 23 in such a way that the cushion rod 24 can rotate around a shaft line parallel to the joining axis 22. The other end of the cushion rod 24 is joined to the lower part of the swing arm 19 through another joining axis 25 in such a way that the cushion rod 24 can rotate. The cushion unit 21 comprises a damper 26 and a coil spring 27. The upper end of the damper 26 is joined to the motorcycle-body frame 10. The coil spring 27 is provided between the upper and lower ends of the damper 26. The lower end of the damper 26 is joined to the link mechanism 20.

With the rear-wheel suspending apparatus 15 having such a configuration, by changing the joining point of the cushion unit 21 to the link mechanism 20, the distance from the pivot axis 18 to the point of action by the cushion unit 21 against the link mechanism 21, that is, the so-called lever ratio can be varied, allowing the height of the motorcycle to be changed. A motorcycle-height changing means 28 for changing the height of the motorcycle comprises a driving unit 29, an operating unit 30 for varying the lever ratio of the link mechanism 20, and a pair of transmission cables 31 and 32. The driving unit 29 includes a motor 35 which functions as an actuator.

Figure 4:
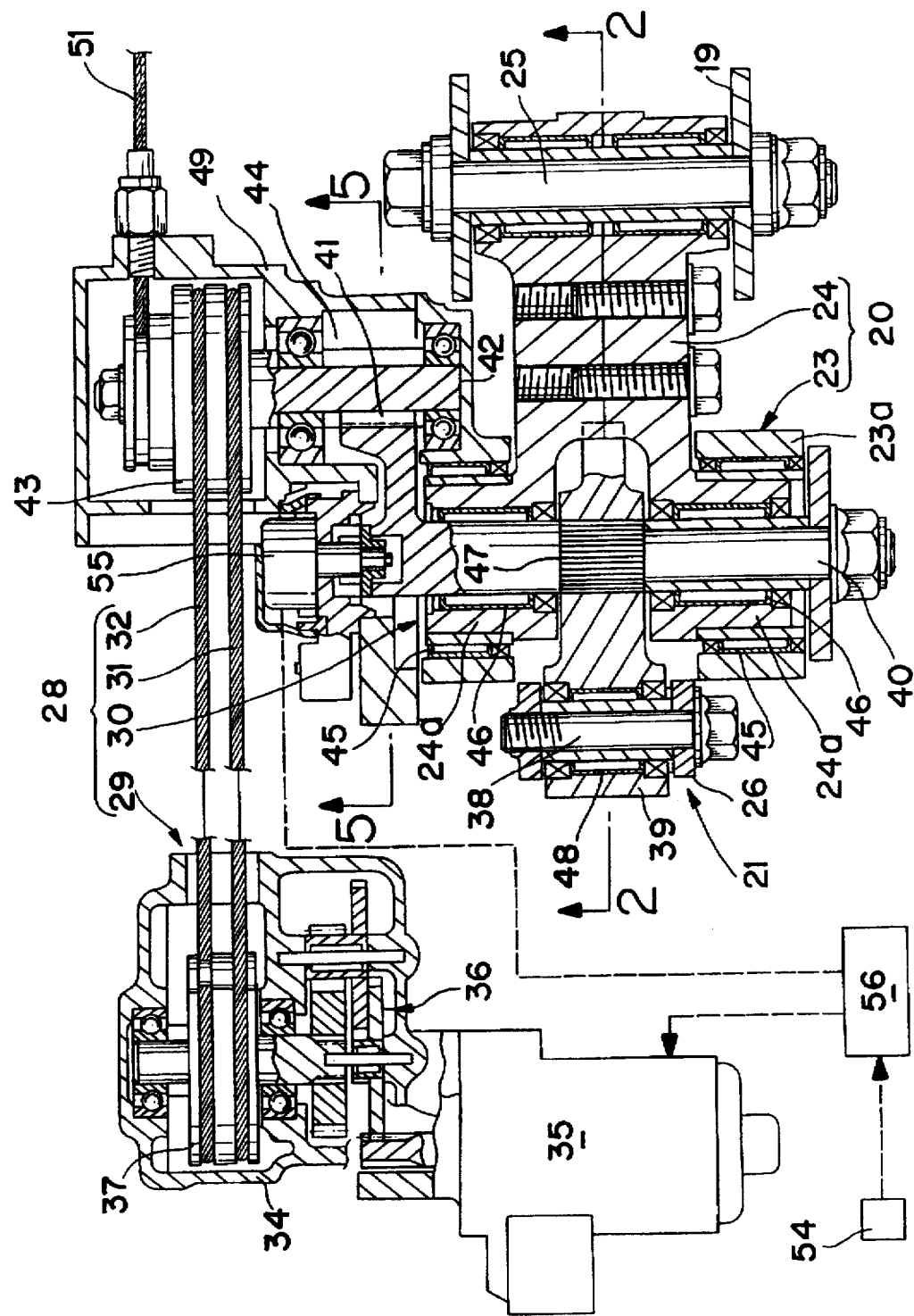
FIG. 4 is a cross-sectional diagram along a line 4—4 shown in FIG. 2.
Figure 5:
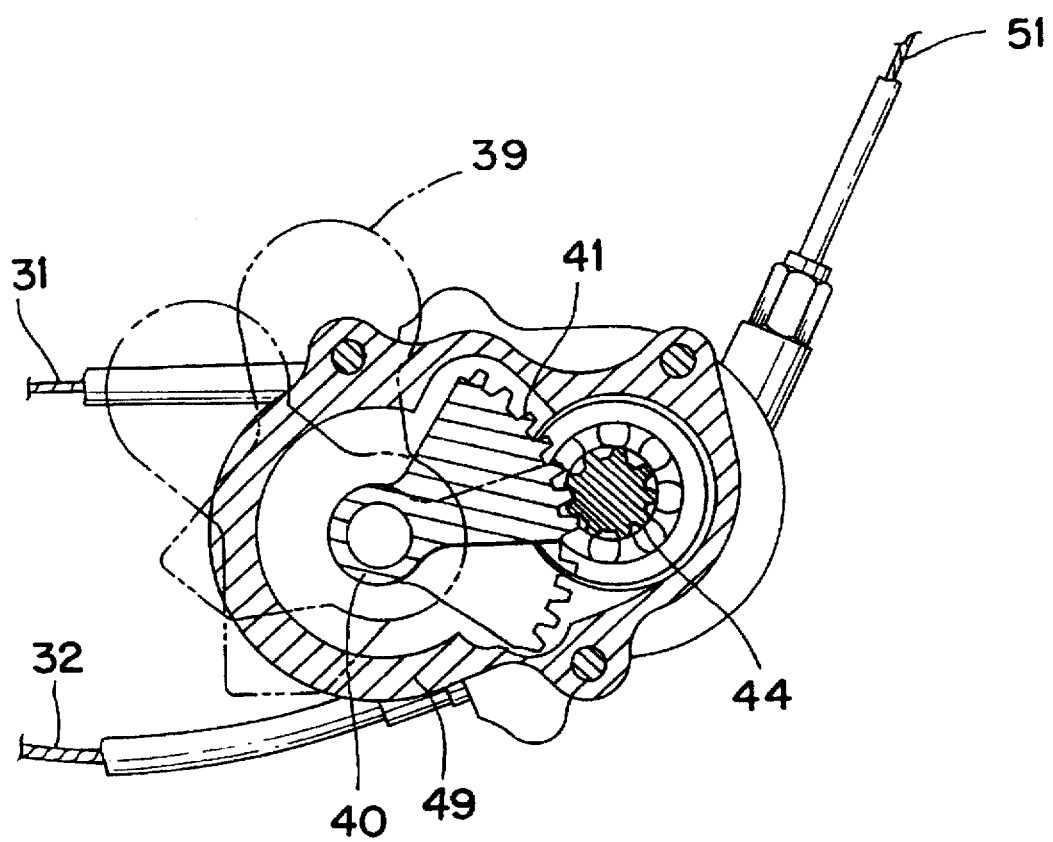
FIG. 5 is a cross-sectional diagram along a line 5—5 shown in FIG. 4.

As shown in FIGS. 2 or 3, the driving unit 29 is supported firmly by a bracket 33 which is fixed to the motorcycle-body frame 10 above the swing arm 19. As shown in FIG. 4, the driving unit 29 comprises the motor 35, a gear train 36 and a driving pulley 37. The motor 35 is fixed in a case 34 in such a way that the motor 35 can freely rotate in both normal and reversed directions. The case 34 is attached firmly to the bracket 33. The gear train 36 is accommodated in the case 34. The input side of the gear train 36 is joined to the motor 35. The driving pulley 37 is joined to the output side of the gear train 36 and supported by the case 34 in such a way that the driving pulley can freely rotate inside the case 34.

The cables 31 and 32 are wound around the driving pulley 37 in directions opposite to each other. The ends of both the cables 31 and 32 are engaged with and fixed to the driving pulley 37.

As shown in FIG. 4, the operating unit 30 comprises a cushion link arm 39, a rotating axis 40, a sector toothed wheel 41, a rotated axis 42, a rotated pulley 43 and a toothed wheel 44 engaged with the sector toothed wheel 41. The end of the cushion link arm 39 is joined to the lower end of the cushion unit 21, that is, the lower end of the damper 26 through a joining axis 38. The rotating axis 40 fixed to the base end of the cushion link arm 39 has a shaft line parallel to the joining axis 38. The sector toothed wheel 41 is provided at one end of the rotating axis 40. The rotated axis 42 has a shaft line parallel to the rotating axis 40. The rotated pulley 43 is provided at one end of the rotated axis 42 whereas the toothed wheel 44 is provided at the other end of the rotated axis 42.

At one end of the cushion rod 24, a pair of cylindrical bosses 24a are provided at locations separated from each other by a gap in the shaft-line direction of the bosses 24a. The bosses 24a are accommodated in a cylinder 23a provided on the link arm 23. Bearings 45 are inserted as interfaces between both the bosses 24a and the cylinder 23a. In addition, the rotating axis 40 coaxially passes through both the bosses 24a. Bearings 46 are inserted as interfaces between both the bosses 24a and the rotating axis 40. The base end of the cushion link arm 39 is firmly engaged with the rotating axis 40 through a serration 47 between the bosses 24a. A bearing 48 is inserted as an interface between the end of the cushion link arm 39 and the joining axis 38 linked to the lower end of the cushion unit 21.

A case 49 is joined to the link arm 23 so as to cover one end of the rotating axis 40. The rotated axis 42 is supported by the case 49 and the link arm 23 in such a way that the rotated axis 42 can rotate freely. The transmission cables 31 and 32 are wound around the rotated pulley 43 provided at one end of the rotated axis 42 in directions opposite to each other for transferring power output from the driving unit 29. The other ends of both the transmission cables 31 and 32 are engaged with and fixed to the rotated pulley 43.

With the motorcycle-height changing means 28 having such a configuration, the cushion link arm 39 can be rotated within a typical range of 40 degrees between a former position at a small motorcycle height shown in FIG. 2 and a latter position at a large motorcycle height shown in FIG. 3. It should be noted that the former and latter positions are also referred to hereafter as a small-motorcycle-height position and large-motorcycle-height position, respectively. In other words, when the cushion link arm 39 is rotated to the former position, the swing arm 19 is swung upward, decreasing the height of the motorcycle. When the cushion link arm 39 is rotated to the latter position, on the other hand, the swing arm 19 is swung downward, increasing the height of the motorcycle.

When the load borne by the rear wheel $W_R$ decreases in a small-motorcycle-height state (or at a small-motorcycle-height position) due to, for example, the driver getting off from the seat 14, the motorcycle-body frame 10 and the seat 14 rises due to a reactive force generated by the cushion unit 21. In order to prevent the height of the motorcycle-body frame 10 and the seat 14 above the surface of the road from increasing, a sub-cable 51 with one end thereof connected to the bracket 33 fixed to the motorcycle-body frame 10 is wound around and joined to the rotated pulley 43.

In addition, in order to stabilize the operation of the link mechanism 20 with the cushion link arm 39 positioned at the small-motorcycle-height position shown in FIG. 2 and to stabilize the operation of the link mechanism 20 with the cushion link arm 39 positioned at the large-motorcycle-height position shown in FIG. 3, stoppers 52 and 53 are provided on the link arm 23 and the cushion rod 24, respectively. The stopper 52 stops the cushion link arm 39 when the cushion link arm 39 is placed at the small-motorcycle-height position whereas the stopper 53 stops the cushion link arm 39 when the cushion link arm 39 is placed at the large-motorcycle-height position. In addition, in the rotating range of the cushion link arm 39 determined by the stoppers 52 and 53, an angle formed by the center line of the cushion unit 21 and the center line of the cushion link arm 39 never exceeds 180 degrees in the entire stroke region of the cushion unit 21. As a result, the link shape of the link mechanism 20 does not change.

Figure 6:
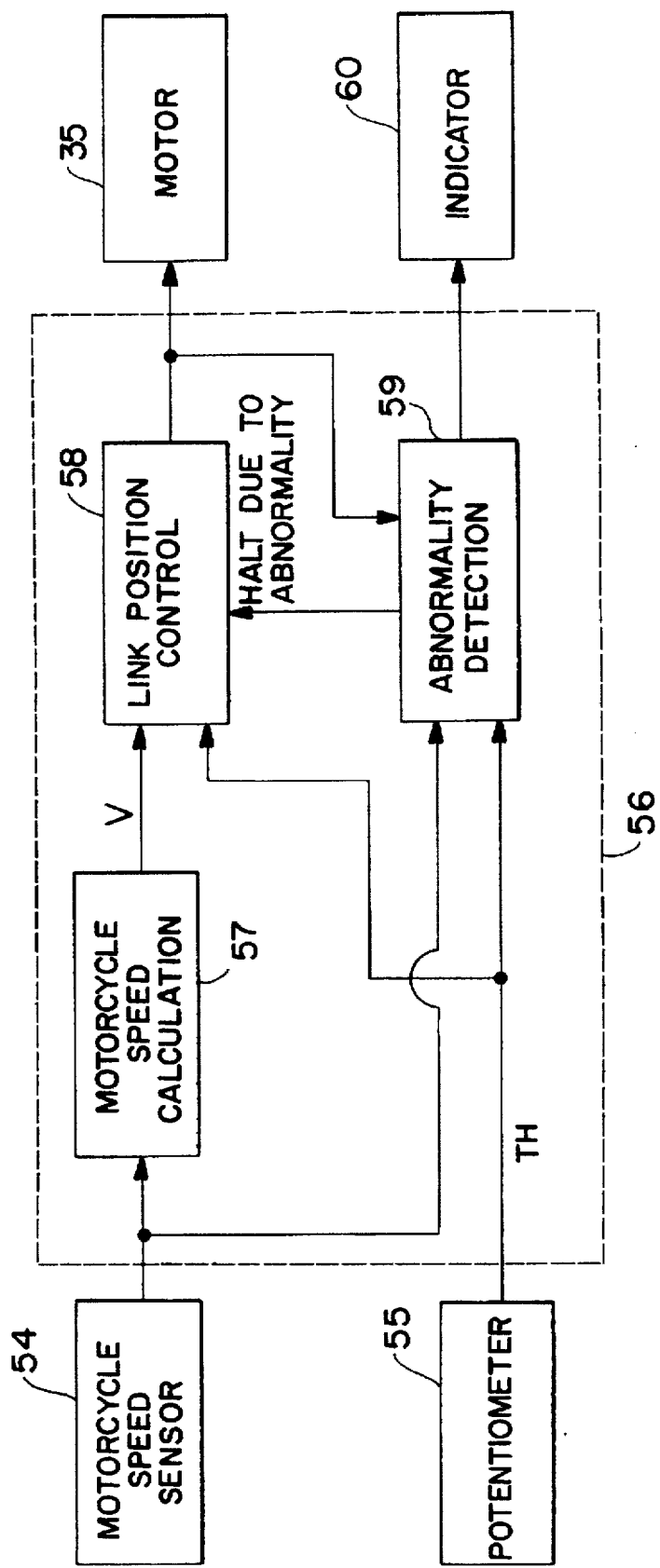
FIG. 6 is a diagram showing the configuration of an electronic control unit.

The adjustment of the height of the motorcycle by the motorcycle-height changing means 28 shown in FIG. 6, that is, the operation of the motor 35, is controlled by an electronic control unit (ECU) 56. The electronic control unit 56 receives a detection signal output by a motorcycle speed sensor 54 as well as a rotation position TH of the rotating axis 40, that is, a rotation position of the cushion link arm 39 which is detected by a potentiometer 55 installed in the case 49 at a location exposed to one end of the rotating axis 40.

The electronic control unit 56 comprises a motorcycle-speed computing means 57 for deriving the speed V of the motorcycle from the detection signal output by the motorcycle-speed sensor 54, a link-position controlling means 58 for controlling the operation of the motor 35 on the basis of the speed V and the rotation position TH, and an abnormality detecting means 59 for determining whether or not the operation of the motorcycle-height changing means 28 is normal and stopping the control of the operation of the motor 35 by the link-position controlling means 58 in the event of a detected abnormality as well as displaying the abnormality by means of an indicator 60. The abnormality detecting means 59 detects an abnormality by comparison of a signal output by the link-position controlling means 58 to the rotation position TH output by the potentiometer 55 and, at the same time, also detects an abnormality by using a detection value output by the motorcycle-speed sensor 54.

Figure 7:
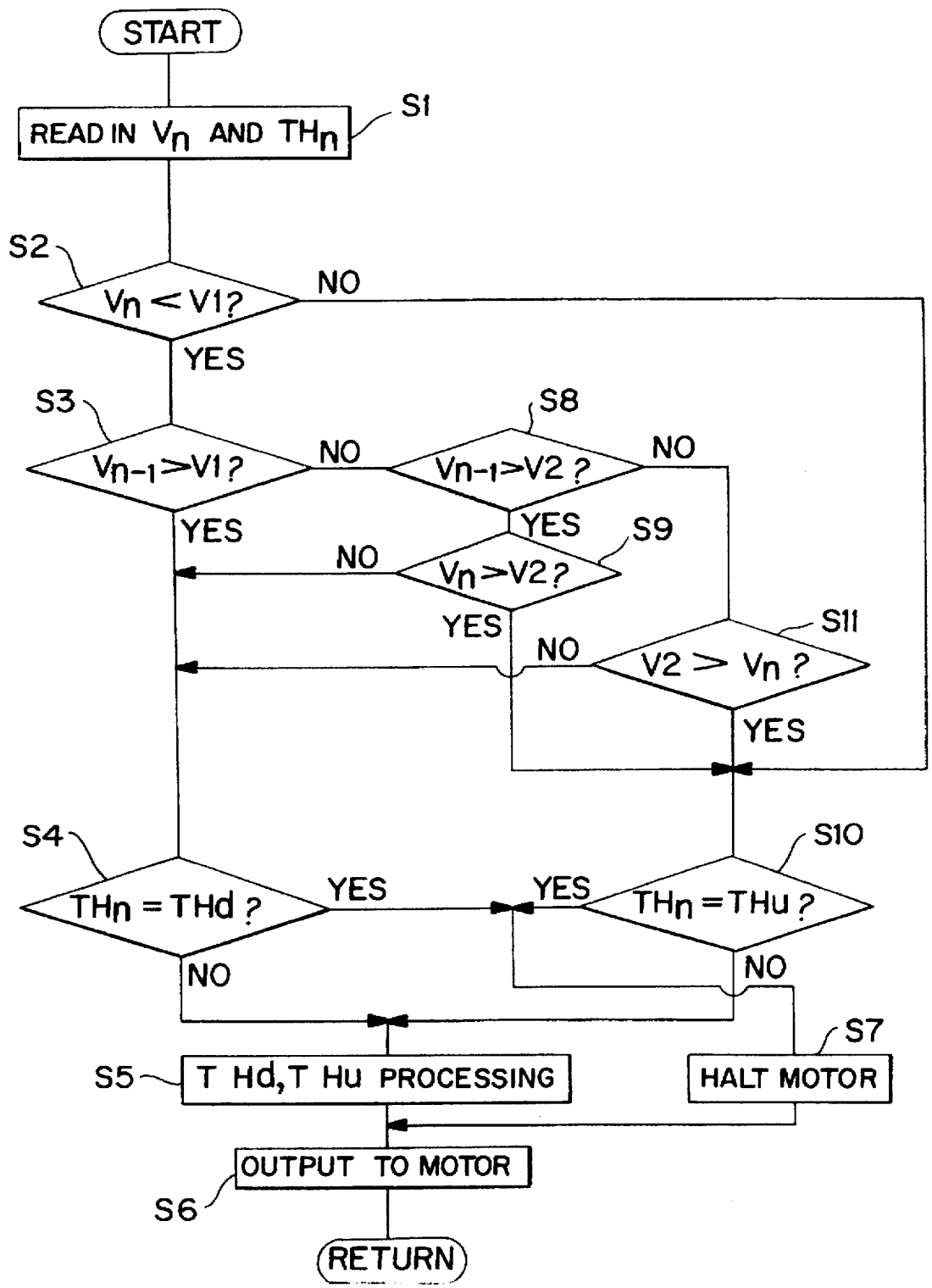
FIG. 7 shows a flowchart of a control procedure adopted by the electronic control unit.

In the link-position controlling means 58 employed by the electronic control unit 56, a control procedure shown in FIG. 7 is set for controlling the operation of the motorcycle-height changing means 28. At a first step S1 of the control procedure shown in FIG. 7, a present computed motorcycle speed $V_n$ output by the motorcycle-speed computing means 57 and the present detected value $TH_n$ output by the potentiometer 55 are read in. The control flow then proceeds to a second step S2 to examine whether or not the present computed speed $V_n$ is smaller than first set motorcycle speed data V1 ($V_n<V1$). The first set motorcycle speed data V1 is basically data used for triggering an operation to change the height of the motorcycle to a small value upon deceleration of the motorcycle. The trigger motorcycle speed data V1 of the motorcycle is set at a relatively high value.

If $V_n<V1$ is found at the second step S2, the control flow continues to a third step S3. If $V_n \geq V1$ is found at the second step S2, on the other hand, the control flow proceeds to a tenth step S10. At the third step S3, a previous computed speed $V_n-1$ of the motorcycle is compared to the first set speed data V1 to examine whether or not the former exceeds the latter ($V_{n-1}>V1$). If $V_{n-1}>V1$ is found at the third step S3, the control flow continues to a fourth step S4. If $V_{n-1} \leq V1$ is found at the third step S3, on the other hand, the control flow proceeds to an eighth step S8.

At the fourth step S4, the present detected value $TH_n$ output by the potentiometer 55 is compared to a down-command value THd to determine whether or not the former is equal to the latter. If the former is found not equal to the latter at the fourth step S4, the control flow continues to a fifth step S5 to process the down-command value THd using the PID processing. The control flow then proceeds to a sixth step S6 to output a driving signal to the motor 35. If THn is found equal to THd ($TH_n=THd$) at the fourth step S4, on the other hand, the control flow proceeds to a seventh step S7 to halt the operation of the motor 35. Then, the control flow continues to the sixth step S6.

As described above, with $V_{n-1} \leq V1$ found at the third step S3, the control flow continues to an eighth step S8 to determine whether or not the previous computed speed $V_{n-1}$ exceeds second set motorcycle speed data V2 ($V_{n-1}>V2$). The second set motorcycle speed data V2 is basically data used for triggering an operation to change the height of the motorcycle to a large value at acceleration of the motorcycle. The trigger motorcycle speed data V2 of the motorcycle is set at a value smaller than the first set motorcycle speed data V1.

If $V_{n-1}$ is found larger than V2 ($V_{n-1}$>V2) at the eighth step S8, the control flow proceeds to a ninth step S9 to determine whether or not a present computed motorcycle speed $V_n$ is greater than the second set motorcycle speed data V2 ($V_n$>V2). If $V_n$ is found greater than V2 ($V_n$>V2) at the ninth step S9, the control flow proceeds to the fourth step S4. If $V_n$ is found smaller than or equal to V2 ($V_n \leq$V2) at the ninth step S9, on the other hand, the control flow proceeds from the ninth step S9 to the tenth step S10. At the tenth step S10, the present detected value $TH_n$ output by the potentiometer 55 is compared to an up-command value THu to determine whether or not the former is equal to the latter. If the former is found not equal to the latter at the tenth step S10, the control flow continues to a fifth step S5 to process the up-command value THu using the PID processing. If $TH_n$ is found equal to THu ($TH_n$=THu) at the tenth step S10, on the other hand, the control flow proceeds to the seventh step S7.

Figure 8:
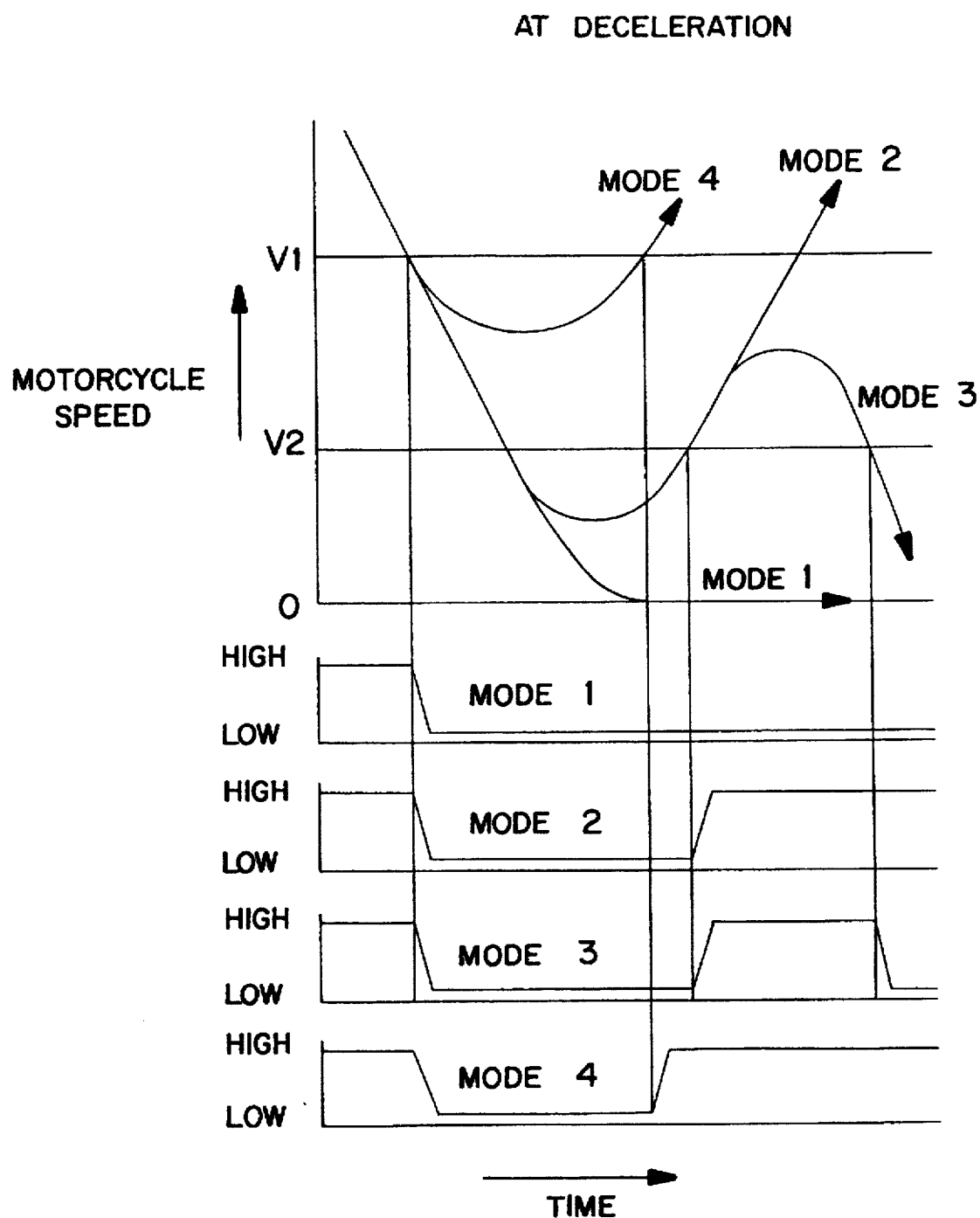
FIG. 8 is a diagram showing variations in motorcycle height in accordance with the motorcycle-speed changing mode at deceleration.

According to the control procedure described above, the height of the motorcycle can be adjusted in one of four motorcycle-speed changing modes MODE 1 to MODE 4 when the motorcycle is decelerated as shown in FIG. 8. In MODE 1, the motorcycle is decelerated with the speed V of the motorcycle reduced from a value greater than the first set motorcycle speed data V1 to a halted state. In MODE 2, the speed V of the motorcycle is once reduced from a value greater than the first set motorcycle speed data V1 to a value smaller than the second set motorcycle speed data V2 before finally being brought back to a value greater than the first set motorcycle speed data V1. In MODE 3, the speed V of the motorcycle is first reduced from a value greater than the first set motorcycle speed data V1 to a value smaller than the second set motorcycle speed data V2, and then increased to a value greater than the second set motorcycle speed data V2 and kept in a state above the second set motorcycle speed data V2 for a while before finally being brought back to a value smaller than the second set motorcycle speed V2. In MODE 4, the speed V of the motorcycle is once reduced from a value greater than the first set motorcycle speed data V1 to a value smaller than the first set motorcycle speed data V1 but greater than the second set motorcycle speed data V2 before finally being brought back to a value greater than the first set motorcycle speed data V1. In MODE 1, the operation of the motor 35 to decrease the height of the motorcycle is started as soon as the speed V of the motorcycle becomes smaller than the first set motorcycle speed data V1. The second set motorcycle speed data V2 does not function as motorcycle speed data for triggering an operation toward a small motorcycle height even when the speed V of the motorcycle becomes smaller than the second set motorcycle speed data V2 because the height of the motorcycle has then already been reduced. Much like MODE 1, in MODE 2, the operation of the motor 35 to decrease the height of the motorcycle is started as soon as the speed V of the motorcycle becomes smaller than the first set motorcycle speed data V1. Later on, however, the operation of the motor 35 to increase the height of the motorcycle is started as soon as the speed of the motorcycle becomes greater than the second set motorcycle speed data V2. The first set motorcycle speed data V1 does not function as motorcycle speed data for triggering an operation toward a large motorcycle height even when the speed V of the motorcycle becomes greater than the first set motorcycle speed data V1 because the height of the motorcycle has then already been increased. Much like MODE 1, in MODE 3, the operation of the motor 35 to decrease the height of the motorcycle is started as soon as the speed V of the motorcycle becomes smaller than the first set motorcycle speed data V1. Likewise, the second set motorcycle speed data V2 does not function as motorcycle speed data triggering an operation toward a small motorcycle height even when the speed V of the motorcycle becomes smaller than the second set motorcycle speed data V2 because the height of the motorcycle has then already been reduced. Later on, however, the operation of the motor 35 to increase the height of the motorcycle is started as soon as the speed V of the motorcycle becomes greater than the second set motorcycle speed data V2. When the speed V of the motorcycle again becomes smaller than the second set motorcycle speed data V2, the second set motorcycle speed data V2 now functions as motorcycle speed data for triggering an operation toward a small motorcycle height, operating the motor 35 to decrease the height of the motorcycle. In MODE 4, the operation of the motor 35 to decrease the height of the motorcycle is started as soon as the speed V of the motorcycle becomes smaller than the first set motorcycle speed data V1. Later on, the operation of the motor 35 to increase the height of the motorcycle is started as soon as the speed V of the motorcycle again becomes greater than the first set motorcycle speed data V1.

Figure 9:
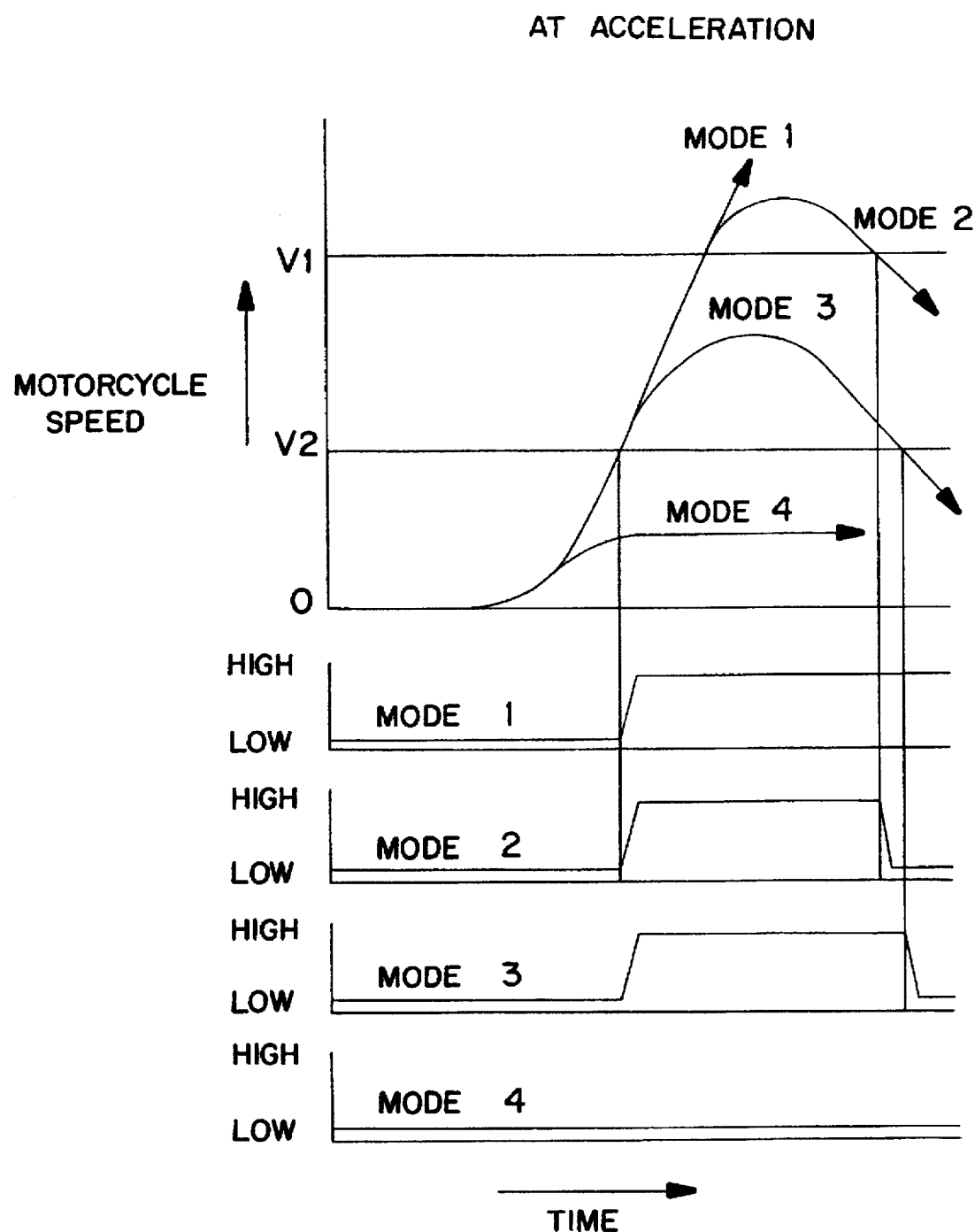
FIG. 9 is a diagram showing variations in motorcycle height in accordance with the motorcycle-speed changing mode at acceleration.

When the motorcycle is accelerated, the height of the motorcycle can be adjusted in one of four motorcycle-speed changing modes MODE 1 to MODE 4 as shown in FIG. 9. In MODE 1, the motorcycle is accelerated with the speed V of the motorcycle increased from a halted state to a value greater than the first set motorcycle speed data V1. In MODE 2, the motorcycle is accelerated with the speed V of the motorcycle once increased from a halted state to a value greater than the first set motorcycle speed data V1 before finally being brought back to a value smaller than the first set motorcycle speed data V1. In MODE 3, the speed V of the motorcycle is once increased from a halted state to a value greater than the second set motorcycle speed data V2 before finally being brought back to a value smaller than the second set motorcycle speed data V2. In MODE 4, the speed V of the motorcycle is increased from a halted state to a value smaller than the second set motorcycle speed data V2 and kept at a value smaller than the second set motorcycle speed V2. In MODE 1, the operation of the motor 35 to increase the height of the motorcycle is started as soon as the speed V of the motorcycle becomes greater than the second set motorcycle speed data V2. Much like MODE 1, in MODE 2, the operation of the motor 35 to increase the height of the motorcycle is started as soon as the speed V of the motorcycle becomes greater than the second set motorcycle speed data V2. Later on, however, the speed V of the motorcycle once exceeds the first set motorcycle speed data V1 and then goes down again to a value smaller than the first set motorcycle speed data V1. When the speed V of the motorcycle becomes smaller than the first set motorcycle speed data V1, the first set motorcycle speed data V1 functions as motorcycle speed data for triggering an operation toward a small motorcycle height, operating the motor 35 to decrease the height of the motorcycle. Much like MODE 2, in MODE 3, the operation of the motor 35 to increase the height of the motorcycle is started as soon as the speed V of the motorcycle becomes greater than the second set motorcycle speed data V2. However, the speed V of the motorcycle is kept for a while at values greater than the second motorcycle speed data V2 before being brought back to a value smaller than the second set motorcycle speed data V2. When the speed V of the motorcycle becomes smaller than the second set motorcycle speed data V2, the second set motorcycle speed data V2 functions as motorcycle speed data triggering an operation toward a small motorcycle height, operating the motor 35 to decrease the height of the motorcycle. In MODE 4, the motor 35 does not operate, keeping the height of the motorcycle at a low value as it is because the speed V of the motorcycle is kept at values smaller than the second set motorcycle speed data V2.

In the adjustment to decrease and increase the height of the motorcycle carried out by the first embodiment, the first set motorcycle speed data V1 and the second set motorcycle speed data V2 lower than the first set motorcycle speed data V1 are set in advance. When the speed V of the motorcycle is continuously reduced from a value greater than the first set motorcycle speed data V1 to a value smaller than the second set motorcycle speed data V2 at deceleration of the motorcycle, the first set motorcycle speed data V1 functions as motorcycle speed data for triggering an operation toward a small motorcycle height, causing the motorcycle-height changing means 28 to carry out an operation for lowering the height of the motorcycle. When the speed V of the motorcycle is continuously increased from a value smaller than the second set motorcycle speed data V2 at a halted state to a value greater than the second set motorcycle speed data V2 at acceleration of the motorcycle, on the other hand, the second set motorcycle speed data V2 functions as motorcycle speed data for triggering an operation toward a large motorcycle height, causing the motorcycle-height changing means 28 to carry out an operation for raising the height of the motorcycle. In this way, the operation of the motor 35 employed in the motorcycle-height changing means 28 is started to decrease the height of the motorcycle by the relatively large first set motorcycle speed data V1 at deceleration of the motorcycle. Accordingly, the motorcycle can be prevented from being halted before the sampling time of the motorcycle-speed sensor 54, the processing time required by the electronic control unit 56 and the operation time required by the motor 35 elapse. As a result, the motorcycle can be halted after the height thereof has been completely lowered. In addition, the operation of the motor 35 employed in the motorcycle-height changing means 28 is started to increase the height of the motorcycle by the relatively small second set motorcycle speed data V2 at the time the motorcycle is started. Accordingly, the height of the motorcycle can be increased early. As a result, the driver does not lose the comfort of driving.

On top of that, the various motorcycle-speed changing modes allow pieces of set motorcycle speed data for triggering operations toward low and high speeds of the motorcycle, which pieces of data are different from each other, to be used. To be more specific, in MODE 4 of the deceleration, the first set motorcycle speed data functions as motorcycle speed data for triggering an operation toward high speed operation of the motorcycle whereas in MODE 3 of the acceleration, the second set motorcycle speed data V2 functions as motorcycle speed data for triggering an operation toward low speed operation of the motorcycle. As a result, the height of the motorcycle can be adjusted properly in accordance with changes in motorcycle speed.

In MODE 4 of the deceleration, the speed V of the motorcycle is finally brought back to a value greater than the first set motorcycle speed data V1 from a state, in which the height of the motorcycle has already been decreased, without attaining the second set motorcycle speed data V2. In MODE 3 of the acceleration, on the other hand, the speed V of the motorcycle is finally brought back to a value smaller than the second set motorcycle speed data V2 from a state, in which the height of the motorcycle has already been increased, without attaining the first set motorcycle speed data V1. The state of the already decreased or increased height of the motorcycle can be detected, allowing either the first or second set motorcycle speed data V1 or V2 to be selected as motorcycle speed data for triggering an operation toward a large or small height of the motorcycle on the basis of information on the detected state of the motorcycle height. As a result, the height of the motorcycle can be adjusted properly in accordance with the height of the motorcycle as an alternative technique.

As another embodiment of the present invention, an inhibitor switch is employed for detecting the state of the side stand 17 cited earlier. It should be noted that the inhibitor switch itself is not shown in the figure. When the inhibitor switch detects the in-use state of the side stand 17 or the side stand 17 put at a lowered position, the motorcycle must be in a halted state. In this case, a small height of the motorcycle can be assumed. In addition, the differential of a throttle-opening signal output by the engine can be used as an alternative. That is to say, when the differential is almost equal to zero, or when the motorcycle is running at a low speed with the opening of the throttle nearly fixed, the height of the motorcycle is not changed. For a differential of the throttle-opening signal equal to a large negative or positive value, on the other hand, deceleration with the throttle opening closed or acceleration with the throttle opening opened can be deduced. In this case, set motorcycle speed data for deceleration or acceleration can then be retrieved from a table prepared in advance. Furthermore, the operation time required by the motorcycle-height changing means 28, that is, the operation time of the engine 35 can be made variable. In this case, by increasing the operation time to a relatively large value for a high motorcycle speed, the magnitude of a shock occurring in an operation to decrease the height of the motorcycle can be reduced.

A second embodiment provided by the present invention is shown in FIGS. 10 to 14.

Figure 10:
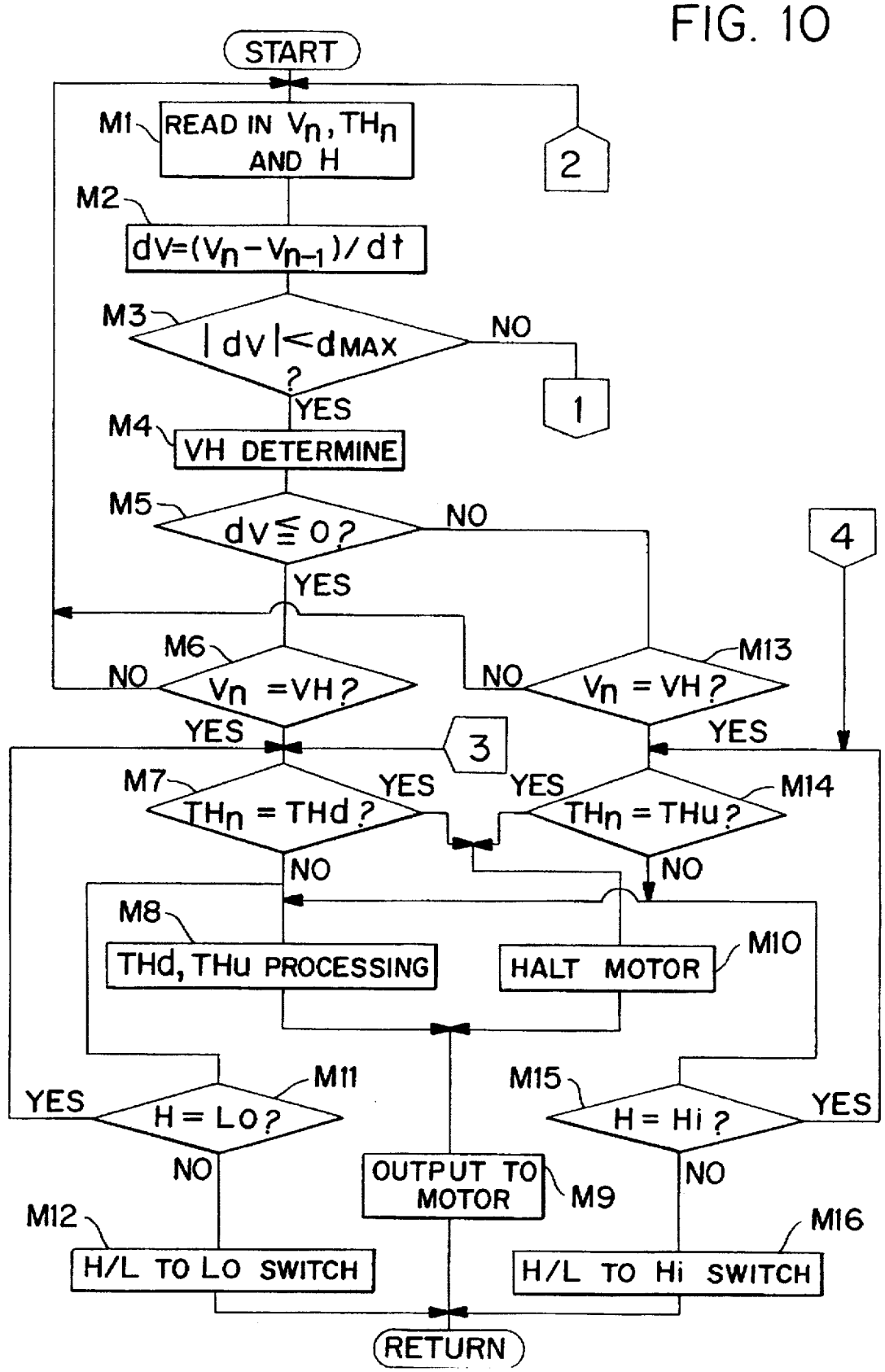
FIG. 10 shows a flowchart of part of a control procedure adopted by a second embodiment.
Figure 11:
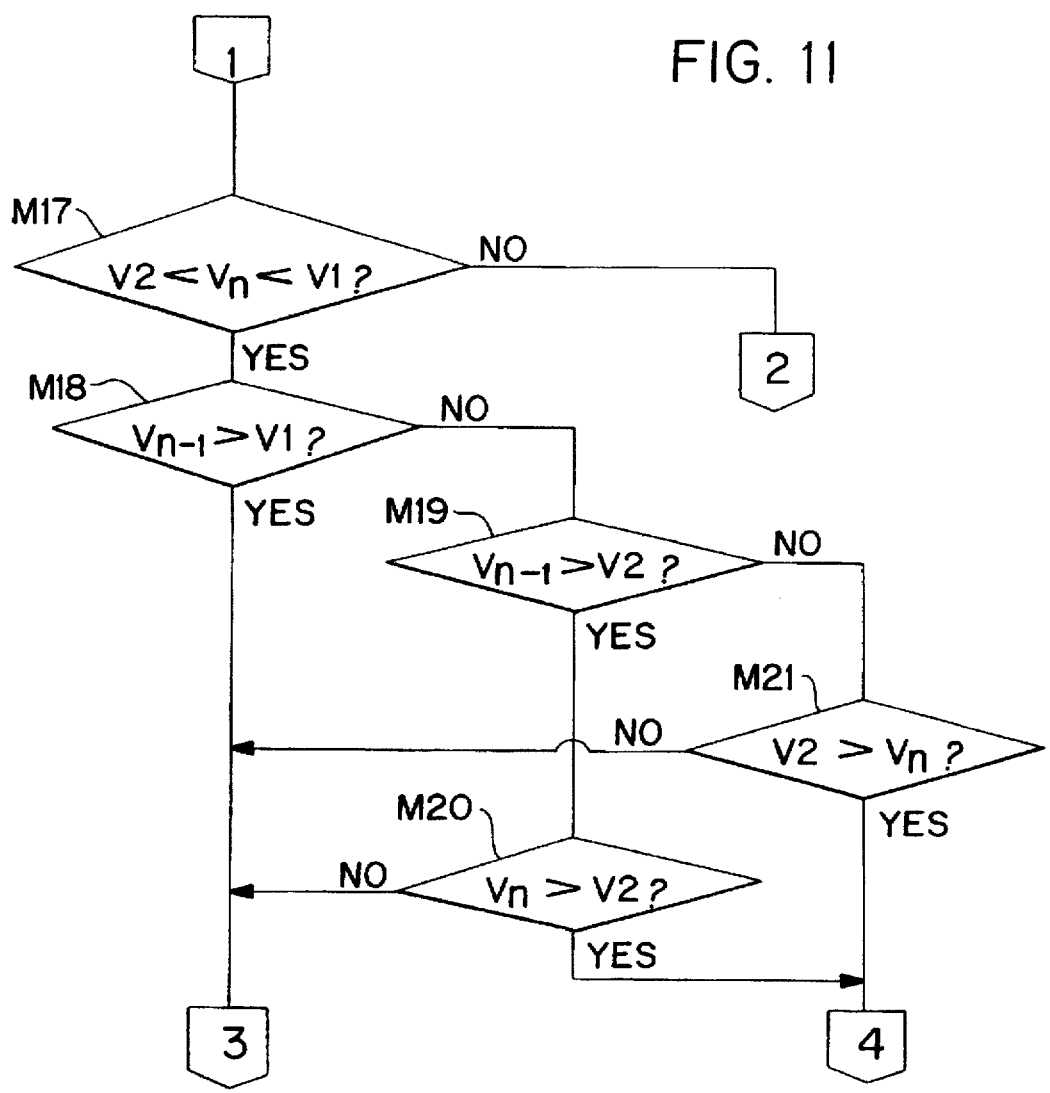
FIG. 11 shows a flowchart of the remaining part of the control procedure adopted by a second embodiment.

Components identical with those employed in the first embodiment are denoted by the same reference numerals. A control procedure for adjusting the height of the motorcycle is shown in FIGS. 10 and 11. At a first step M1 of the control procedure, a present computed motorcycle speed $V_n$ derived from a detection value output by the motorcycle speed sensor 54, the present detected value $TH_n$ output by the potentiometer 55 and a Hi/Lo position H of the headlight are read in. At a second step M2, a change in motorcycle speed dV is computed. An acceleration/deceleration of the motorcycle speed dV/dt is computed by first subtracting a previous computed motorcycle speed $V_{n-1}$ from the present computed motorcycle speed $V_n$. The difference resulting from the subtraction is then divided by a time dt required for one-time processing to give an acceleration or deceleration $\{(V_n-V_{n-1})/dt\}$. At a third step M3, the absolute value $|dV|$ of the change in motorcycle speed dV is compared to an allowable maximum value $dV_{MAX}$ to check whether or not the former exceeds the latter. If $|dV|<dV_{MAX}$ is found at the third step M3, the control flow proceeds to a fourth step M4.

Figure 12:
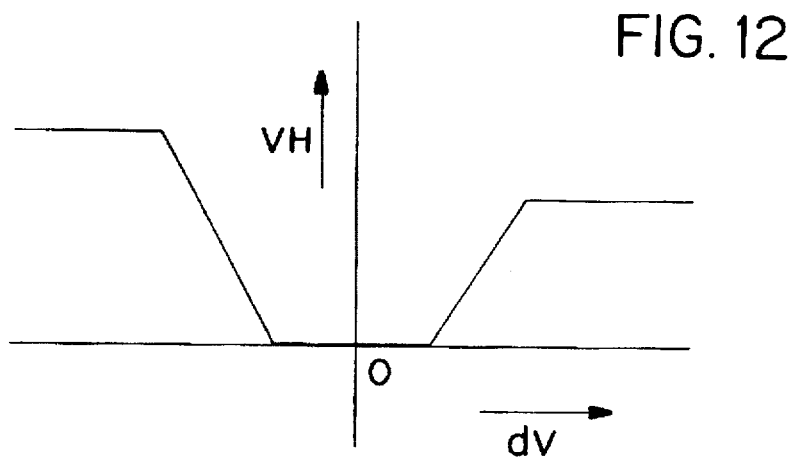
FIG. 12 is a diagram showing a set map of height-adjustment starting set speeds based on the acceleration and deceleration.

At the fourth step M4, a map created in advance as shown in FIG. 12 is used for determining the value of height-adjustment starting set speed data VH from the change in motorcycle speed dV. It is obvious from FIG. 12 that, in the case of deceleration, the height-adjustment starting set speed data VH is set at a large or small value for abrupt or gradual deceleration respectively. Similarly, in the case of acceleration, the height-adjustment starting set speed VH data is set at a large or small value for abrupt or gradual acceleration, respectively.

At a next fifth step M5, the change in motorcycle speed dV is compared to zero to find out whether the motorcycle is being decelerated or accelerated. If dV≦0 or the motorcycle is found decelerated at the fifth step M5, the control flow proceeds to a sixth step M6 to determine whether or not the present computed motorcycle speed $V_n$ is equal to the height-adjustment starting set speed data VH. If $V_n$=VH is found at the sixth step M6, the process flow proceeds to a seventh step M7. If $V_n$ is found not equal to VH at the sixth step M6, on the other hand, the process flow returns to the first step M1.

At the seventh step M7, the present detected value $TH_n$ output by the potentiometer 55 is compared to a down-command value THd to determine whether or not the former is equal to the latter. If the former is found not equal to the latter at the seventh step M7, the control flow continues to an eighth step M8 to process the down-command value THd using PID processing. The control flow then proceeds to a ninth step M9 to output a driving signal to the motor 35. If $TH_n$ is found equal to THd ($TH_n$=THd) at the seventh step M7, on the other hand, the control flow proceeds to a tenth step M10 to halt the operation of the motor 35. Then, the control flow continues to the ninth step M9.

In addition, if the present detected value $TH_n$ output by the potentiometer 55 is found not equal to the down-command value THd at the seventh step M7, the control flow also proceeds to an eleventh step M11 in parallel to the eighth step M8 to check whether or not the Hi/Lo position H of the headlight is Lo. If H=Lo is found at the eleventh step M11, the control flow returns to the seventh step M7. If H=Hi is found at the eleventh step M11, on the other hand, the flow proceeds to a twelfth step M12 to switch the Hi/Lo position H of the headlight from Hi to Lo.

If the change in motorcycle speed dV is found greater than zero or the motorcycle is found accelerated at the fifth step M5, the control flow jumps to a thirteenth step M13 to determine whether or not the present computed motorcycle speed $V_n$ is equal to the height-adjustment starting set speed data VH. If $V_n$=VH is found at the thirteenth step M13, the process flow proceeds to a fourteenth step M14. If $V_n$ is found not equal to VH at the thirteenth step M13, on the other hand, the process flow returns to the first step M1.

At the fourteenth step M14, the present detected value $TH_n$ output by the potentiometer 55 is compared to an up-command value THu to determine whether or not the former is equal to the latter. If the former is found not equal to the latter at the fourteenth step M14, the control flow continues to an eighth step M8 to process the up-command value THu using PID processing. If $TH_n$ is found equal to THu ($TH_n$=THu) at the fourteenth step M14, on the other hand, the control flow proceeds to a tenth step M10.

In addition, if the present detected value $TH_n$ output by the potentiometer 55 is found not equal to the up-command value THu at the fourteenth step M14, the control flow also proceeds to a fifteenth step M15 in parallel to the eighth step M8 to check whether or not the Hi/Lo position H of the headlight is Hi. If H=Hi is found at the fifteenth step M15, the control flow returns to the fourteenth step M14. If H=Lo is found at the fifteenth step M15, on the other hand, the flow proceeds to a sixteenth step M16 to switch the Hi/Lo position H of the headlight from Lo to Hi.

If the absolute value |dV| of the change in motorcycle speed dV is found equal to or greater than the allowable maximum value $dV_{MAX}$ or |dV| is found abnormal at the third step M3, the control flow proceeds to a seventeenth step M17 shown in FIG. 11 to determine whether or not the present computed motorcycle speed $V_n$ is greater than second set motorcycle speed data V2 and smaller than first set motorcycle speed data V1 (V2 <$V_n$<V1).

If the present computed motorcycle speed $V_n$ is found to be greater than the second set motorcycle speed data V2 and smaller than the first set motorcycle speed data V1 (V2<$V_n$<V1) at the seventeenth step M17, the process flow continues to an eighteenth step M18 to determine whether or not the previous computed motorcycle speed $V_n$−1 exceeds the first set speed data V1 ($V_{n-1}$>V1). If $V_{n-1}$ is found to be greater than V1 ($V_{n-1}$>V1) at the eighteenth step M18, the control flow returns to the seventh step M7 shown in FIG. 10. If $V_{n-1}$ is found to be smaller than or equal to V1 ($V_{n-1}$>V1) at the eighteenth step M18, on the other hand, the control flow proceeds to a nineteenth step M19.

At the nineteenth step M19, the previous computed speed $V_{n-1}$ is compared to the second set motorcycle speed data V2 to determine whether or not the former is greater than the latter ($V_{n-1}$>V2). If $V_{n-1}$>V2 is found at the nineteenth step M19, the control flow continues to a twentieth step M20 to determine whether or not the present computed motorcycle speed $V_n$ is greater than the second set motorcycle speed data V2 ($V_n$>V2). If $V_n$>V2 is found at the twentieth step M20, the control flow continues to the seventh step M7. If $V_n$≦V2 is found at the twentieth step M20, on the other hand, the control flow proceeds to the fourteenth step M14 shown in FIG. 10. If the previous computed speed $V_{n-1}$ is found smaller than or equal to the second set motorcycle speed data V2 at the nineteenth step M19 ($V_{n-1}$≦V2), on the other hand, the control flow continues to a twenty-first step M21 to determine whether or not the present computed motorcycle speed $V_n$ is smaller than the second set motorcycle speed V2 (V2>$V_n$). If V2>$V_n$ is found at the twenty-first step M21, the control flow continues to the fourteenth step M14. If V2≦$V_n$ is found at the twenty-first step M21, on the other hand, the control flow proceeds to the seventh step M7.

Figure 13:
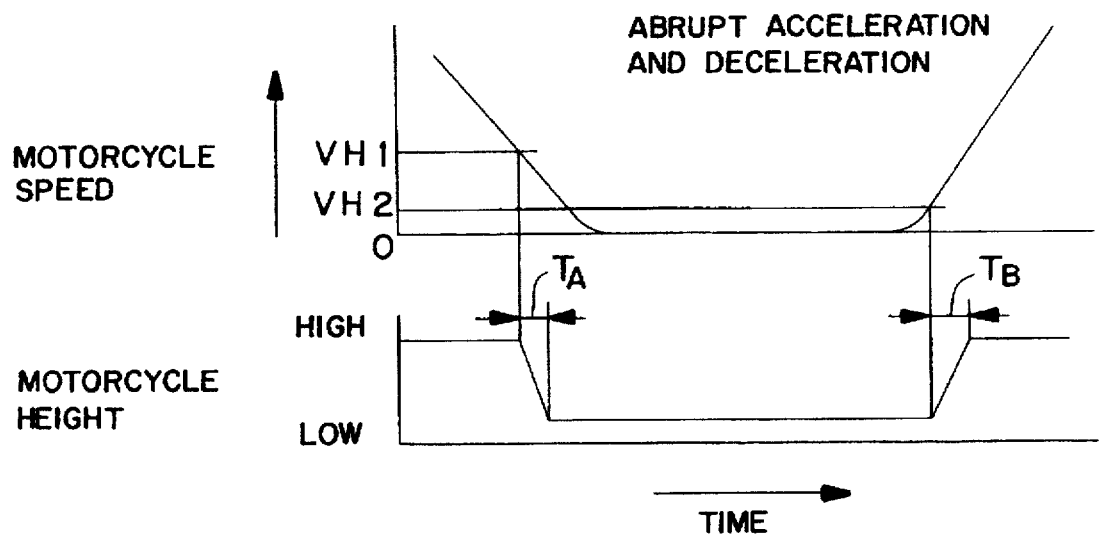
FIG. 13 is a diagram showing variations in motorcycle height at abrupt acceleration and deceleration.
Figure 14:
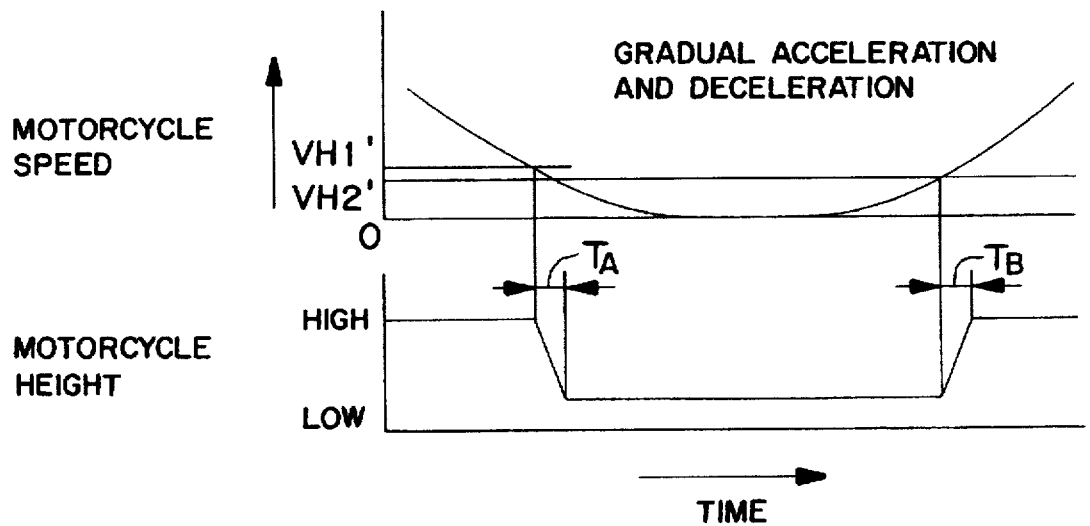
FIG. 14 is a diagram showing variations in motorcycle height at gradual acceleration and deceleration.

In the second embodiment, the height-adjustment starting set speed data VH is changed depending upon the value of the change in motorcycle speed dV. At abrupt acceleration and deceleration, the height of the motorcycle is adjusted as shown in FIG. 13. At gradual acceleration and deceleration, on the other hand, the height of the motorcycle is adjusted as shown in FIG. 14. It is obvious from FIG. 13 that, in the case of abrupt acceleration or deceleration, the height of the motorcycle is increased or decreased from relatively large height-adjustment starting set speed data VH2 or VH1. In the case of gradual acceleration or deceleration, on the other hand, the height of the motorcycle is increased or decreased from relatively small height-adjustment starting set speed data VH2' or VH1'. As a result, at deceleration, the motorcycle can be stopped after an operation time $T_A$ required to completely reduce the height of the motorcycle from a large value to a small one has elapsed regardless of whether the deceleration is abrupt or gradual. On top of that, at acceleration, the speed V of the motorcycle, which is achieved after the operation time $T_B$ required to completely raise the height of the motorcycle from a small value to a large one has elapsed, remains approximately unchanged regardless of whether the acceleration is abrupt or gradual, providing the driver with comfort of driving.

By the way, when the value detected by the motorcycle-speed sensor 54 contains even a small amount of noise or the like, a noise component is inevitably emphasized in the acceleration or deceleration dV/dt obtained as a differential of the speed V of the motorcycle which is, in turn, computed from a value detected by the motorcycle-speed sensor 54. If the height-adjustment starting set speed data VH is determined in such an abnormal state, we can assume that the height-adjustment starting set speed data VH will inevitably deviate much from a desired value. None the less, the absolute value |dV| of the change in motorcycle speed dV exceeding the allowable maximum value $dV_{MAX}$ is regarded as a value of an abnormal state. In this case, the height of the motorcycle is adjusted on the basis of the speed V of the motorcycle, allowing the disturbance of the control caused by the introduced noise to be prevented.

As another embodiment of the present invention, the operation time required by the motorcycle-height changing means 28, that is, the operation time of the engine 35 can be made variable. In such an embodiment, by increasing the operation time to a relatively large value, the magnitude of an operational shock occurring in abrupt acceleration or deceleration can be reduced.

As a third embodiment of the present invention, the speed of the operation of the cushion link arm 39 accompanying the rotation of the motor 35 can be reduced while the cushion link arm 39 is moving in order to relieve a shock occurring in the operation of the motorcycle-height changing means 28 to change the height of the motorcycle.

Figure 15:
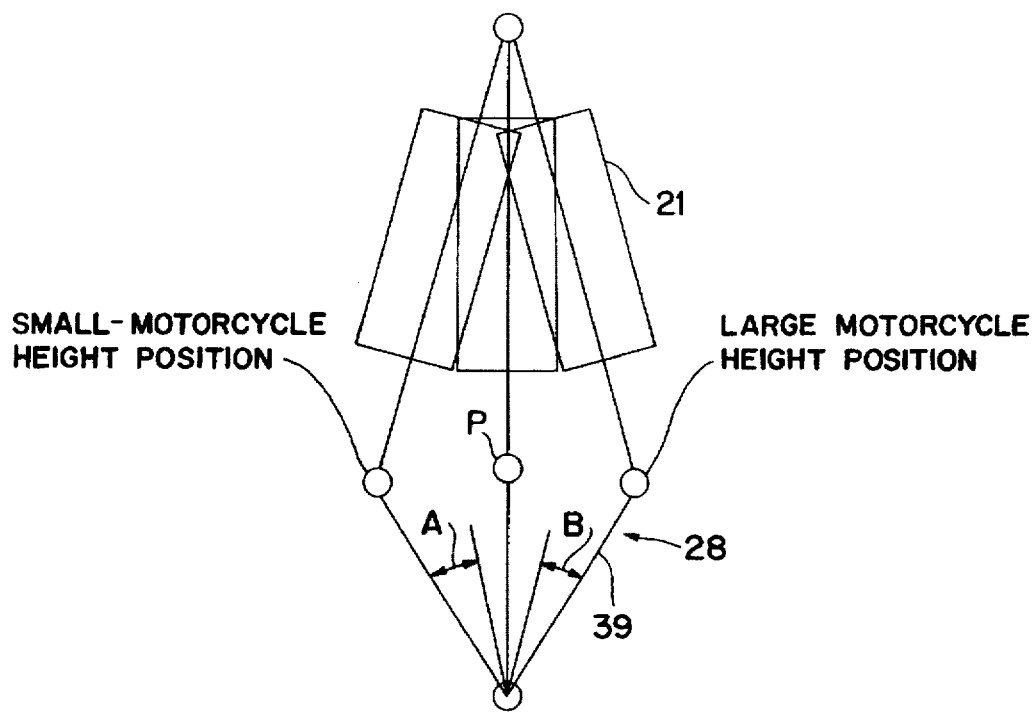
FIG. 15 is a diagram showing a simplified portion of the motorcycle-height changing means which diagram is used for explaining a third embodiment.

The operating speed of the cushion link arm 39 can be reduced as follows. As shown in FIG. 15, the cushion link arm 39 which is joined to the cushion unit 21 passes a change-point P for shrinking the cushion unit 21 as much as possible in a swinging operation between a large-motorcycle-height position and a small-motorcycle-height position. After passing through the change-point P, the cushion link arm 39 is accelerated by a reactive force of the cushion unit 21. Here, during control segments A and B after passing through the change-point P in a swinging operation between the large-motorcycle-height position and the small-motorcycle-height position, the speed of the motor 35, that is, the speed of the cushion link arm 39 is reduced. At that time, PID control of the motor 35 based on the amount of the angular displacement of the cushion link arm 39 can be carried out.

Figure 16:
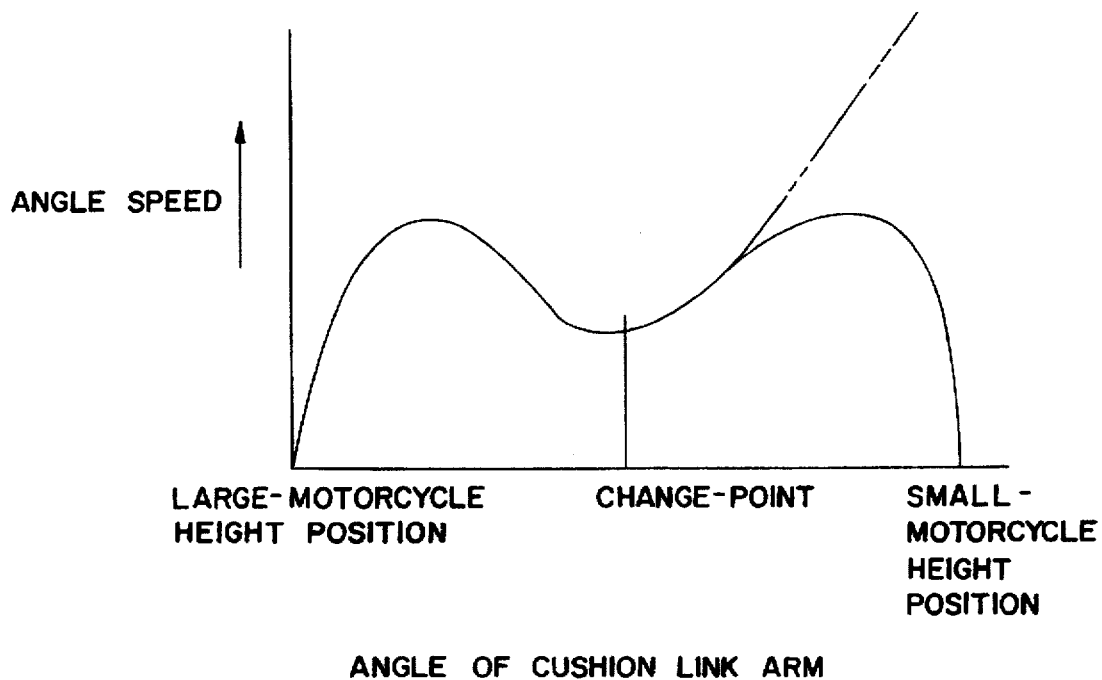
FIG. 16 is a diagram showing the angular speed of a cushion link arm.

By so doing, typical angular speeds of the cushion link arm 39 in a swing from the large-motorcycle-height position to the small-motorcycle-height position are shown by a solid line in FIG. 16. It is obvious from FIG. 16 that the angular speed is reduced from the high angular speeds obtained without the speed-reduction control which speeds are shown by a dashed line. In this way, the magnitude of a shock caused by a collision with the stopper 53 shown in FIG. 2 can thus be reduced. Likewise, the magnitude of a shock caused by a collision with the stopper 52 shown in FIG. 3 in a swing from the small-motorcycle-height position to the large-motorcycle-height position can also be reduced as well.

Figure 17:
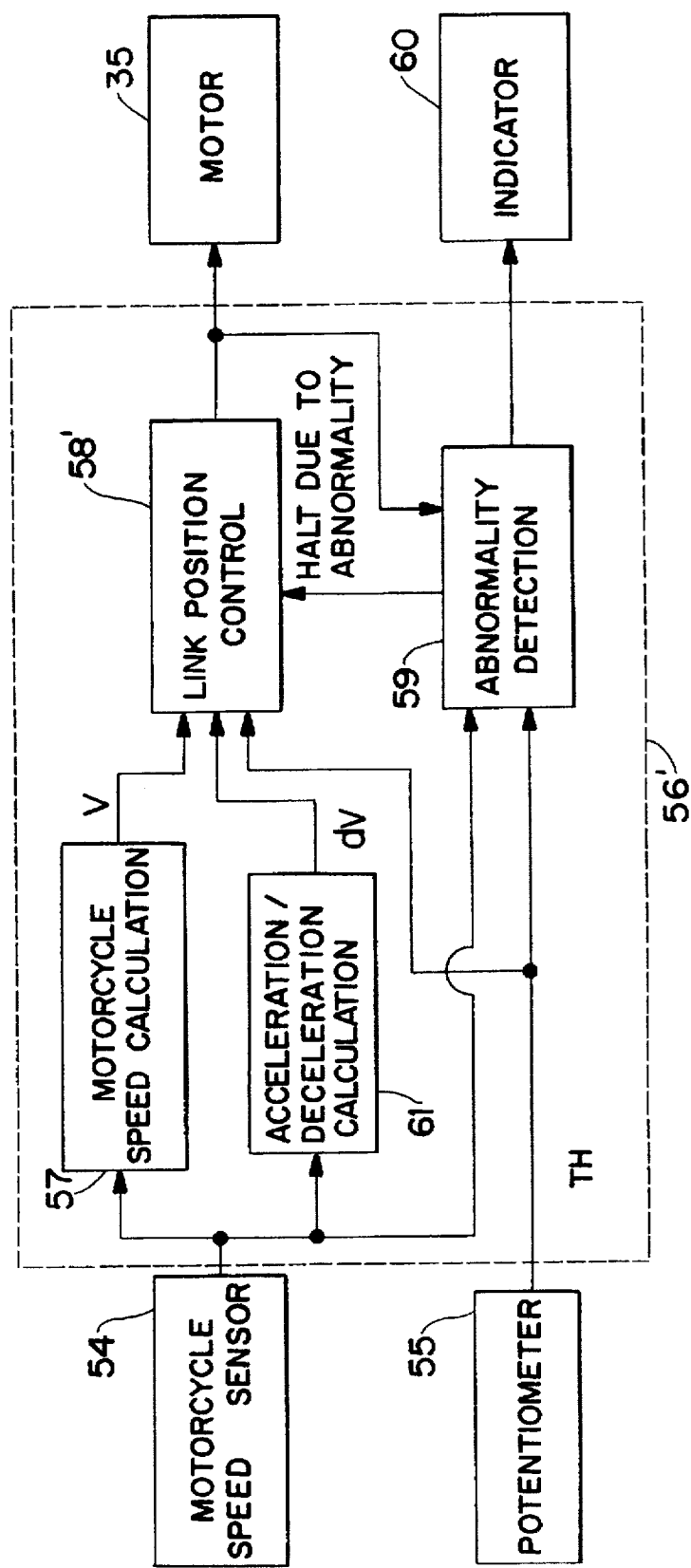
FIG. 17 is a diagram showing the configuration of a fourth embodiment implementing an electronic control unit.

A fourth embodiment provided by the present invention is shown in FIGS. 17 to 22. As shown in FIG. 17, the electronic control unit 56' comprises a motorcycle-speed computing means 57 for deriving the speed V of the motorcycle from a detection signal output by a motorcycle-speed sensor 54, an acceleration/deceleration computing means 61 for deriving the acceleration and deceleration dV of the motorcycle from the detection signal output by the motorcycle-speed sensor 54, a link-position controlling means 58' for controlling the operation of the motor 35 on the basis of the speed V, the acceleration or deceleration dV and the rotation position TH, and an abnormality detecting means 59 for determining whether or not the operation of the motorcycle-height changing means 28 is normal and stopping the control of the operation of the motor 35 by the link-position controlling means 58' in the event of a detected abnormality as well as displaying the abnormality by means of an indicator 60.

Figure 18:
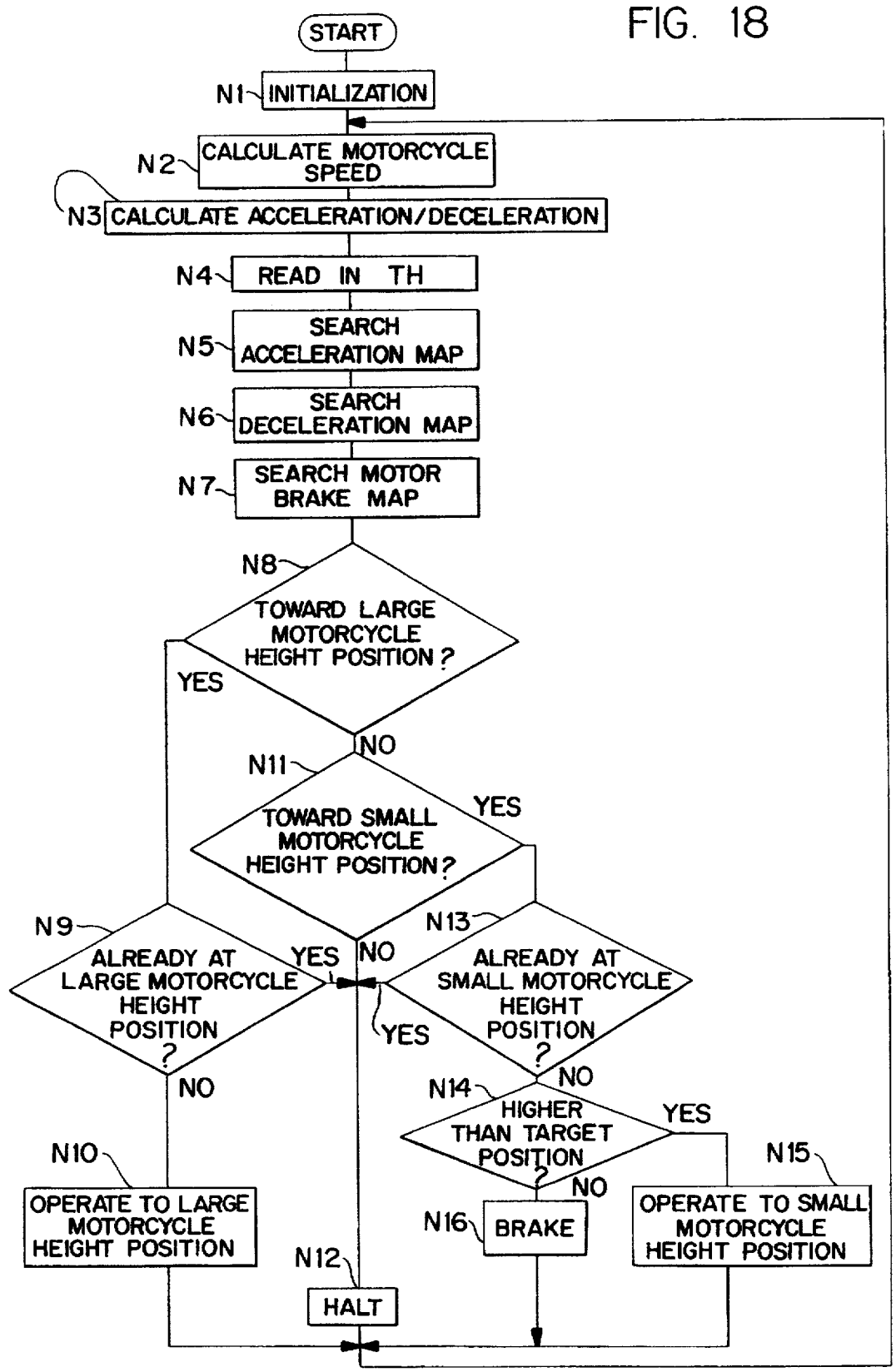
FIG. 18 shows a flowchart of a control procedure adopted by the electronic control unit.

In the link-position controlling means 58' employed by the electronic control unit 56' with such a configuration, a control procedure shown in FIG. 18 is adopted for controlling the operation of the motorcycle-height changing means 28. At a first step N1 of the control procedure shown in FIG. 18, initialization is carried out. Then, at a next second step N2, the motorcycle-speed computing means 57 calculates the speed V of the motorcycle. Subsequently, at a next third step N3, the acceleration/deceleration computing means 61 derives the acceleration and deceleration. At a subsequent fourth step N4, a detection value TH output by a potentiometer 55 is read in.

Figure 19:
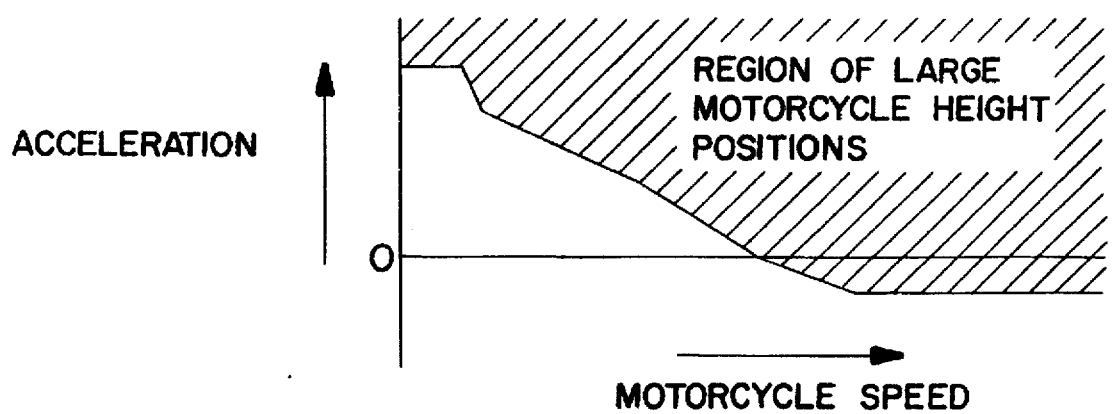
FIG. 19 is a diagram showing an acceleration map.
Figure 20:
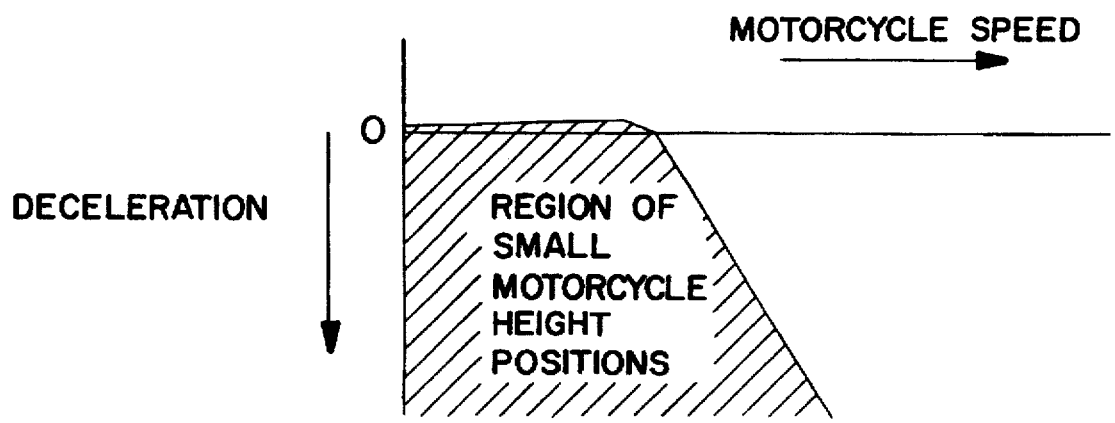
FIG. 20 is a diagram showing a deceleration map.
Figure 21:
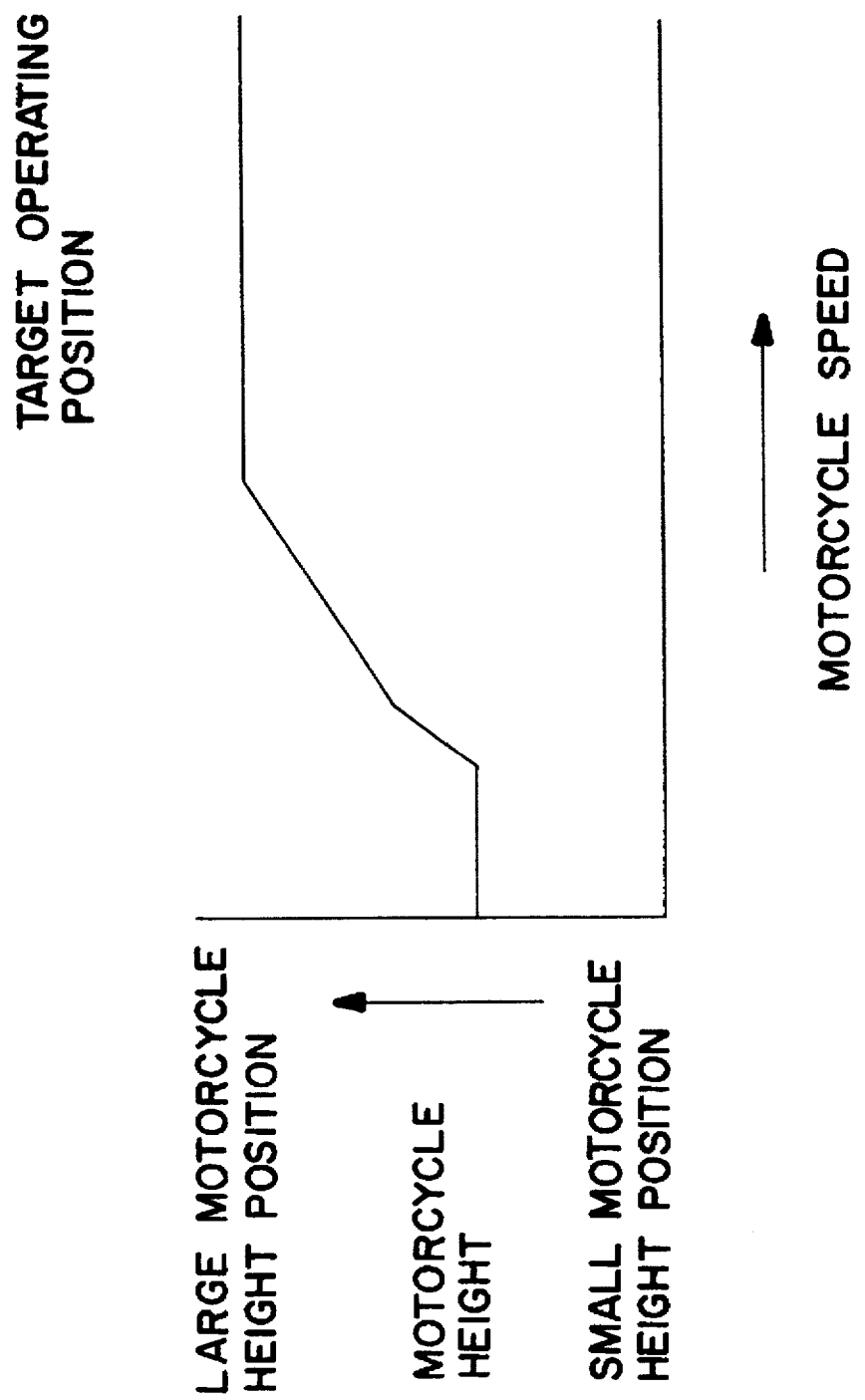
FIG. 21 is a diagram showing a map for target operating positions.

At a fifth step N5, the acceleration map is searched. To be more specific, a hatched region of large motorcycle heights is defined in advance as shown in FIG. 19 with the speed and the acceleration of the motorcycle taken as the horizontal and vertical axes respectively. The hatched region of large-motorcycle-height positions is searched at the fifth step N5 for a point representing the speed and the acceleration computed at the second and third steps N2 and N3 respectively to determine whether or not the point exists inside our outside the hatched region. At a sixth step N6, the deceleration map is searched. To be more specific, a hatched region of small-motorcycle-height positions is defined in advance as shown in FIG. 20 with the speed and the deceleration of the motorcycle taken as the horizontal and vertical axes respectively. The hatched region of small-motorcycle height positions is searched at the sixth step N6 for a point representing the speed and the deceleration computed at the second and third steps N2 and N3 respectively to determine whether the point exists inside or outside the hatched region. At a seventh step N7, a motor-brake map is searched. FIG. 21 is a diagram showing a map of target operating positions of the motorcycle-height changing means 28 shown in FIGS. 2 and 3. A target operating position, is a desired position in the midst of an operation carried out by the motorcycle-height changing means 28 in migration from a large-motorcycle-height position to a small-motorcycle-height position with the motor 35 driven to lower the height of the motorcycle during deceleration of the motorcycle. As shown in FIG. 21, the higher the speed of the motorcycle, the larger the value at which the target operating position is set. The search based on the map shown in FIG. 21 is executed at the seventh step N7 to compare the current operating position of the motorcycle-height changing means 28 to the target.

At an eighth step NS, the outcomes of the map searching operations carried out at the fifth and sixth steps N5 and N6 are used to determine whether or not the motorcycle-height changing means 28 is to be operated toward a large-motorcycle-height position. If the motorcycle-height changing means 28 is to be operated toward the large-motorcycle-height position, the control flow proceeds to a ninth step N9 to determine whether or not the operation toward the large-motorcycle-height position has been completed. If the operation toward the large-motorcycle-height position is found not completed at the ninth step N9, the control flow proceeds to a tenth step N10 to continue the operation of the motor 35 to move the motorcycle-height changing means 28 to the large-motorcycle-height position. If the operation toward the large-motorcycle-height position is found completed at the ninth step N9, on the other hand, the control flow proceeds to a twelfth step N12 to halt the operation of the motor 35.

If the motorcycle-height changing means 28 is found not to be operated toward a large-motorcycle-height position at the eighth step N8, the control flow proceeds to an eleventh step N11. At the eleventh step N11, the outcomes of the map searching operations carried out at the fifth and sixth step N5 and N6 are used to determine whether or not the motorcycle-height changing means 28 is to be operated toward a small-motorcycle-height position. If the motorcycle-height changing means 28 is found at the eleventh step N11 not to be operated toward the small-motorcycle-height position, or the height of the motorcycle is to be sustained, the control flow proceeds to the twelfth step N12 to halt the operation of the motor 35. If the motorcycle-height changing means 28 is found at the eleventh step N11 to be operated toward the small-motorcycle-height position, on the other hand, the control flow proceeds to a thirteenth step N13 to determine whether or not the operation toward the small-motorcycle-height position has been completed. If the operation toward the small-motorcycle-height position is found completed at the thirteenth step N13, the control flow proceeds to the twelfth N12 step to halt the operation of the motor 35.

If the operation toward the small-motorcycle-height position is found not completed at the thirteenth step N13, on the other hand, the control flow proceeds to a fourteenth step N14. The outcome of the search carried out at the seventh step N7 is used at the fourteenth step N14 to determine whether the operating position of the motorcycle-height changing means 28 is higher than the target or not. If the operating position of the motorcycle-height changing means 28 is found higher than the target at the fourteenth step N14, the control flow proceeds to a fifteenth step N15 to continue the operation of the motor 35 to move the motorcycle-height changing means 28 to the small-motorcycle-height position. If the operating position of the motorcycle-height changing means 28 is found lower than the target at the fourteenth step N14, on the other hand, the control flow proceeds to a sixteenth step N16 to apply a brake to the motor 35.

In the case of the fourth embodiment, when the speed of the motorcycle varies as shown by the lower curve in FIG. 22, the height of the motorcycle is changed as shown by the upper curve in FIG. 22. That is to say, when the motorcycle-height changing means 28 is operated toward a small-motorcycle-height position during deceleration of the motorcycle, the rotating speed of the motor 35 is reduced by the application of a brake thereto during a period between the target operating position and the small-motorcycle-height position to values lower than the rotating speed during a period between a large-motorcycle-height position and the target operating position. As described earlier, the target operating position is a position in the midst of an operation carried out by the motorcycle-height changing means 28 in migration from a large-motorcycle position to a small-motorcycle-height position. In other words, when the height of the motorcycle is decreased by operating the motorcycle-height changing means 28 from the large-motorcycle-height position to the small-motorcycle-height position, the rate of the change is reduced to a value that results in comfort in the course of the operation.

Much like the third embodiment, a shock can thereby be eliminated at the completion of the change. As described earlier, the higher the speed of the motorcycle, the higher the target operating position. The target operating positions are represented by a straight line in FIG. 22 only for the sake of convenience. In actuality, the target operating position varies as shown in FIG. 21. Accordingly, the height of the motorcycle can also be reduced to a value corresponding to the small-motorcycle-height position before the motorcycle is brought to a standstill regardless of whether the deceleration is gradual or abrupt. On top of that, the height of the motorcycle can be changed smoothly at gradual deceleration, avoiding an abrupt change in motorcycle posture. In addition, the motorcycle-height changing means 28 can be early driven to an operation toward the small-motorcycle-height position at abrupt deceleration, allowing the nosedive to be corrected.

The present invention described above sets the first piece of motorcycle-speed information for starting an operation of an actuator in a direction to increase the height of a motorcycle and the second piece of motorcycle-speed information for starting an operation of the actuator in a direction to decrease the height of the motorcycle at values different from each other, an operation delay can be prevented from being generated in stopping the motorcycle by abrupt deceleration.

The set speed information is changed in accordance with information on motorcycle-height positions, allowing the height of the motorcycle to be adjusted in accordance with the speed of the motorcycle in addition to the configuration of the invention.

The set speed information is changed in accordance with a motorcycle-speed changing mode for changing the speed of the motorcycle, allowing the height of the motorcycle to be adjusted in accordance with a change in motorcycle speed.

In addition, a piece of set speed information for changing the height of the motorcycle is varied in accordance with the rate of change in motorcycle speed, allowing the height of the motorcycle to be adjusted in accordance with the magnitude of the acceleration or deceleration, whereby preventing an operational delay.

In addition, the rate of change in motorcycle speed is checked to find out whether its value is normal or abnormal and the height of the motorcycle is changed in accordance with the speed of the motorcycle if the rate of change is found abnormal, preventing control disturbance from being generated at abnormal acceleration and deceleration due to introduced noise.

The operating speed of the actuator is varied in accordance with the rate of change in motorcycle speed, allowing the height of the motorcycle to be adjusted in accordance with the magnitude of the acceleration or deceleration.

The motorcycle-height changing means is supported by a motorcycle-body frame in such a way that the motorcycle-height changing means can fluctuate and, at the same time, also employs, besides the actuator, a cushion link arm installed between a cushion unit and a link mechanism provided between the motorcycle-body frame and a swing arm supporting a rear wheel in a way allowing the rear wheel to rotate freely, wherein the cushion link arm can be swung to change a lever ratio of the link mechanism by the actuator between a large-motorcycle-height position and a small-motorcycle-height position through a change-point, a point between the large-motorcycle-height position and the small-motorcycle-height position for shrinking the cushion unit as much as possible, wherein the rotating speed of a motor driving the cushion link arm is reduced after the cushion link arm has passed through the change-point so that a shock can be prevented from being generated during the operation of the cushion link arm.

When the actuator is operated to reduce the height of the motorcycle during deceleration, the operating speed of the actuator is reduced during a period between a target operating position and a small-motorcycle-height position, a lower end of the operating range of the motorcycle-height changing means, to values lower than the rotating speeds of the actuator being decelerated during a period between a large-motorcycle-height position, an upper end of the operating range of the motorcycle-height changing means, and the target operating position which is preset between the small-motorcycle-height position and the large-motorcycle position at a value depending upon the speed of the motorcycle, allowing the height of the motorcycle to be reduced to a value corresponding to the small-motorcycle-height position before the motorcycle is brought to a standstill regardless of whether the deceleration is gradual or abrupt and, on top of that, allowing the posture of the motorcycle to be varied in accordance with the magnitude of the deceleration.

The preferred embodiments provided by the present invention have been described so far. It should be noted, however, that the scope of the present invention is not limited to the embodiments. A variety of changes can be made to the design without deviating from the ranges described in the claims of this specification.

What is claimed is:

1. A method for adjusting the height of a motorcycle equipped with a motorcycle-height changing means for increasing and decreasing the height of said motorcycle in accordance with the operation of an actuator controlled in accordance with information on the speed of said motorcycle comprising the following steps:

setting first data of set speed information for starting the operation of said actuator to decrease the height of said motorcycle; and setting second data of set speed information lower than said first set speed information for starting the operation of said actuator to increase the height of said motorcycle.

2. The method for adjusting the height of a motorcycle according to claim 1, wherein said first and second data of set speed information are changed in accordance with information on motorcycle-height positions.

3. The method for adjusting the height of a motorcycle according to claim 1, wherein said first and second data of set speed information are changed in accordance with a motorcycle-speed changing mode for changing the speed of said motorcycle.

4. The method for adjusting the height of a motorcycle according to claim 1, wherein a piece of set speed information for changing the height of said motorcycle is varied in accordance with the rate of change in motorcycle speed.

5. The method for adjusting the height of a motorcycle according to claim 4, wherein the rate of change in motorcycle speed is checked to determine whether its value is normal or abnormal and the height of said motorcycle is changed in accordance with the speed of said motorcycle if the rate of change is found abnormal.

6. The method for adjusting the height of a motorcycle according to claim 1, further comprising the steps of:

providing a motorcycle-body frame for supporting said motorcycle-height changing means such that said motorcycle-height changing means can fluctuate;

providing a swing arm for supporting a rear wheel to allow the rear wheel to rotate freely;

providing a link mechanism between said motorcycle-body frame and said swing arm;

providing a cushion unit; and providing a cushion link arm between said cushion unit and said link mechanism, wherein said cushion link arm can be swung to change a lever ratio of said link mechanism by said actuator between a large-motorcycle-height position and a small-motorcycle-height position through a change-point, a point between said large-motorcycle-height position and said small-motorcycle-height position for shrinking said cushion unit as much as possible.

7. A method for adjusting the height of a motorcycle equipped with a motorcycle-height changing means for increasing and decreasing the height of said motorcycle in accordance with the operation of an actuator controlled accordance with information on the speed of said motorcycle comprising the following steps:

setting first data of set speed information for starting the operation of said actuator to decrease the height of said motorcycle; and setting second data of set speed information different from said first set speed information for starting the operation of said actuator to increase the height of said motorcycle, wherein a piece of set speed information for changing the height of said motorcycle is varied in accordance with the rate of change in motorcycle speed, and wherein the operating speed of said actuator is varied in accordance with the rate of change in motorcycle speed.

8. The method for adjusting the height of a motorcycle according to claim 7, wherein said first and second data of set speed information are changed in accordance with information on motorcycle-height positions.

9. The method for adjusting the height of a motorcycle according to claim 7, wherein said first and second data of set speed information are changed in accordance with a motorcycle-speed changing mode for changing the speed of said motorcycle.

10. The method for adjusting the height of a motorcycle according to claim 7, wherein the rate of change in motorcycle speed is checked to determine whether its value is normal or abnormal and the height of said motorcycle is changed in accordance with the speed of said motorcycle if the rate of change is found abnormal.

11. The method for adjusting the height of a motorcycle according to claim 7, further comprising the steps of:

providing a motorcycle-body frame for supporting said motorcycle-height changing means such that said motorcycle-height changing means can fluctuate;

providing a swing arm for supporting a rear wheel to allow the rear wheel to rotate freely;

providing a link mechanism between said motorcycle-body frame and said swing arm;

providing a cushion unit; and providing a cushion link arm between said cushion unit and said link mechanism, wherein said cushion link arm can be swung to change a lever ratio of said link mechanism by said actuator between a large-motorcycle-height position and a small-motorcycle-height position through a change-point, a point between said large-motorcycle-height position and said small-motorcycle-height position for shrinking said cushion unit as much as possible.

12. A method for adjusting the height of a motorcycle equipped with a motorcycle-height changing means for increasing and decreasing the height of said motorcycle in accordance with the operation of an actuator controlled in accordance with information on the speed of said motorcycle comprising the following steps:

setting first data of set speed information for starting the operation of said actuator to decrease the height of said motorcycle; and setting second data of set speed information different from said first set speed information for starting the operation of said actuator to increase the height of said motorcycle, wherein when said actuator is operated to reduce the height of said motorcycle during deceleration, the operating speed of said actuator is reduced during a period between a target operating position and a small-motorcycle-height position, a lower end of an operating range of said motorcycle-height changing means, to values lower than operating speeds of said actuator being decelerated during a period between a large-motorcycle-height position, an upper end of said operating range of said motorcycle-height changing means, and said target operating position which is preset between said small-motorcycle-height position and said large-motorcycle-height position.

13. A device for adjusting the height of a motorcycle equipped with a motorcycle-height changing means for increasing and decreasing the height of said motorcycle in accordance with information on the speed of said motorcycle comprising:

a frame for operatively mounting a front wheel of said motorcycle:

a pivot member mounted on said frame for supporting a rear wheel of said motorcycle;

a link mechanism operatively positioned between said frame and said pivot member for adjusting the height of said motorcycle;

an actuator for selectively imparting movement to said link mechanism;

first data generated in relation to set speed information for starting the operation of said actuator to decrease the height of said motorcycle; and second data generated in relation to set speed information lower than said first set speed information for starting the operation of said actuator to increase the height of said motorcycle.

14. The device for adjusting the height of a motorcycle according to claim 13, wherein said first and second data of set speed information are changed in accordance with information on motorcycle-height positions.

15. The device for adjusting the height of a motorcycle according to claim 13, wherein said first and second data of set speed information are changed in accordance with a motorcycle-speed changing mode for changing the speed of said motorcycle.

16. The device for adjusting the height of a motorcycle according to claim 13, wherein a piece of set speed information for changing the height of said motorcycle is varied in accordance with the rate of change in motorcycle speed.

17. The device for adjusting the height of a motorcycle according to claim 16, wherein the rate of change in motorcycle speed is checked to determine whether its value is normal or abnormal and the height of said motorcycle is changed in accordance with the speed of said motorcycle if the rate of change is found abnormal.

18. A device for adjusting the height of a motorcycle equipped with a motorcycle-height changing means for increasing and decreasing the height of said motorcycle in accordance with information on the speed of said motorcycle comprising:

a frame for operatively mounting a front wheel of said motorcycle:

a pivot member mounted on said frame for supporting a rear wheel of said motorcycle;

a link mechanism operatively positioned between said frame and said pivot member for adjusting the height of said motorcycle;

an actuator for selectively imparting movement to said link mechanism;

first data generated in relation to set speed information for starting the operation of said actuator to decrease the height of said motorcycle; and second data generated in relation to set speed information different from said first set speed information for starting the operation of said actuator to increase the height of said motorcycle, wherein a piece of set speed information for changing the height of said motorcycle is varied in accordance with the rate of change in motorcycle speed, and wherein the operating speed of said actuator is varied in accordance with the rate of change in motorcycle speed.

19. A device for adjusting the height of a motorcycle equipped with a motorcycle-height changing means for increasing and decreasing the height of said motorcycle in accordance with information on the speed of said motorcycle comprising:

a frame for operatively mounting a front wheel of said motorcycle:

a pivot member mounted on said frame for supporting a rear wheel of said motorcycle;

a link mechanism operatively positioned between said frame and said pivot member for adjusting the height of said motorcycle;

an actuator for selectively imparting movement to said link mechanism;

first data generated in relation to set speed information for starting the operation of said actuator to decrease the height of said motorcycle;

second data generated in relation to set speed information different from said first set speed information for starting the operation of said actuator to increase the height of said motorcycle, and a cushion link arm installed between a cushion unit and said link mechanism provided between said frame and said pivot axis supporting said rear wheel for allowing said rear wheel to rotate freely, wherein said cushion link arm can be swung to change a lever ratio of said link mechanism by said actuator between a large-motorcycle-height position and a small-motorcycle-height position through a change-point, a point between said large-motorcycle-height position and said small-motorcycle-height position for shrinking said cushion unit as much as possible.

20. The device for adjusting the height of a motorcycle according to claim 19, wherein said first and second data of set speed information are changed in accordance with information on motorcycle-height positions.

21. The device for adjusting the height of a motorcycle according to claim 19, wherein said first and second data of set speed information are changed in accordance with a motorcycle-speed changing mode for changing the speed of said motorcycle.

22. The device for adjusting the height of a motorcycle according to claim 19, wherein a piece of set speed information for changing the height of said motorcycle is varied in accordance with the rate of change in motorcycle speed.

23. The device for adjusting the height of a motorcycle according to claim 22, wherein the rate of change in motorcycle speed is checked to determine whether its value is normal or abnormal and the height of said motorcycle is changed in accordance with the speed of said motorcycle if the rate of change is found abnormal.

24. A device for adjusting the height of a motorcycle equipped with a motorcycle-height changing means for increasing and decreasing the height of said motorcycle in accordance with information on the speed of said motorcycle comprising:

- a frame for operatively mounting a front wheel of said motorcycle;
- a pivot member mounted on said frame for supporting a rear wheel of said motorcycle;
- a link mechanism operatively positioned between said frame and said pivot member for adjusting the height of said motorcycle;
- an actuator for selectively imparting movement to said link mechanism;
- first data generated in relation to set speed information for starting the operation of said actuator to decrease the height of said motorcycle; and
- second data generated in relation to set speed information different from said first set speed information for starting the operation of said actuator to increase the height of said motorcycle,
- wherein when said actuator is operated to reduce the height of said motorcycle during deceleration, the operating speed of said actuator is reduced during a period between a target operating position and a small-motorcycle-height position, a lower end of an operating range of said motorcycle-height changing means, to values lower than operating speeds of said actuator being decelerated during a period between a large-motorcycle-height position, an upper end of said operating range of said motorcycle-height changing means, and said target operating position which is preset between said small-motorcycle-height position and said large-motorcycle-height position.

* * * * *

UNITED STATES PATENT AND TRADEMARK OFFICE
CERTIFICATE OF CORRECTION

PATENT NO. : 5,711,390
DATED : January 27, 1998
INVENTOR(S) : Toichiro Hikichi et al.

It is certified that error appears in the above-indentified patent and that said Letters Patent is hereby corrected as shown below:

On the title page, item
    [30] FOREIGN APPLICATION PRIORITY DATA

The following application should be added:

--May 17, 1995 [JP] Japan    7-118332--

Signed and Sealed this

Twenty-first Day of July, 1998

Attest:

BRUCE LEHMAN

*Attesting Officer*    *Commissioner of Patents and Trademarks*